US011231706B1

(12) United States Patent
Curlander et al.

(10) Patent No.: US 11,231,706 B1
(45) Date of Patent: Jan. 25, 2022

(54) LANDING AND DELIVERY ROBOT

(71) Applicant: Amazon Technologies, Inc., Seattle, WA (US)

(72) Inventors: James Christopher Curlander, Bellevue, WA (US); Jon T. Hanlon, Mercer Island, WA (US); Scott Raymond Harris, Bainbridge Island, WA (US); Jason Leonard Peacock, Bellevue, WA (US); Tally Etel Portnoi, Chesterfield, MO (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 15/273,819

(22) Filed: Sep. 23, 2016

(51) Int. Cl.
*G05D 1/00* (2006.01)
*B25J 5/00* (2006.01)
*B25J 9/16* (2006.01)
*B64C 39/02* (2006.01)
*B64F 1/18* (2006.01)
*G05D 1/02* (2020.01)
*G05D 1/10* (2006.01)
(Continued)

(52) U.S. Cl.
CPC .......... *G05D 1/0011* (2013.01); *B25J 5/005* (2013.01); *B25J 9/162* (2013.01); *B60L 53/00* (2019.02); *B60L 58/12* (2019.02); *B64C 39/024* (2013.01); *B64F 1/18* (2013.01); *G05D 1/0094* (2013.01); *G05D 1/0276* (2013.01); *G05D 1/101* (2013.01); *G06Q 10/0832* (2013.01); *B64C 2201/128* (2013.01); *Y10S 901/01* (2013.01)

(58) Field of Classification Search
CPC .. G05D 1/0011; G05D 1/0094; G05D 1/0276; G05D 1/101; B60L 53/00; B60L 58/12; B25J 5/005; B25J 9/162; B64C 39/024; B64F 1/18; G06Q 10/0832
See application file for complete search history.

(56) References Cited

U.S. PATENT DOCUMENTS

2004/0167682 A1\* 8/2004 Beck .................... B60K 17/046
701/3
2006/0009887 A1\* 1/2006 Rubin .................... G01C 23/00
701/9
(Continued)

FOREIGN PATENT DOCUMENTS

CA          3080223 A1 \*  5/2019  ............. B64D 47/08

*Primary Examiner* — Khoi H Tran
*Assistant Examiner* — Rodney P King
(74) *Attorney, Agent, or Firm* — Lee & Hayes, P.C.

(57) ABSTRACT

A delivery robot may provide an approach notification to enable people to understand and interpret actions by an unmanned aerial vehicle (UAV), such as an intention to land or deposit a package at a particular location. The delivery robot may include a display, lights, a speaker, and one or more sensors to enable the robot to provide information, barcodes, and text to the UAV and/or bystanders. The robot can provide final landing authority, and can "wave-off" the UAV, if an obstacle or person exists in the landing zone. The delivery robot can receive packages and (1) store them for retrieval (2) deliver them to the delivery location and/or (3) deliver them to an automated locker system. The delivery robot can temporarily close lanes or streets to enable a package to be delivered by UAV. The system may include a shelter to secure, maintain, and charge the delivery robot.

21 Claims, 15 Drawing Sheets

(51) Int. Cl.
  G06Q 10/08 (2012.01)
  B60L 53/00 (2019.01)
  B60L 58/12 (2019.01)

(56) References Cited

U.S. PATENT DOCUMENTS

| | | | | |
|---|---|---|---|---|
| 2010/0204919 A1* | 8/2010 | Becker | G08G 5/0086 | 702/5 |
| 2012/0130566 A1* | 5/2012 | Anderson | G05D 1/0858 | 701/16 |
| 2014/0032021 A1* | 1/2014 | Metzler | G01S 5/0036 | 701/3 |
| 2014/0222246 A1* | 8/2014 | Mohamadi | G01S 13/913 | 701/2 |
| 2014/0254896 A1* | 9/2014 | Zhou | B25J 9/0006 | 382/124 |
| 2014/0316616 A1* | 10/2014 | Kugelmass | G05D 1/101 | 701/8 |
| 2014/0330456 A1* | 11/2014 | Lopez Morales | G06Q 10/08355 | 701/3 |
| 2014/0349569 A1* | 11/2014 | Hyde | H04B 7/1555 | 455/11.1 |
| 2015/0102154 A1* | 4/2015 | Duncan | B64C 39/022 | 244/2 |
| 2015/0266575 A1* | 9/2015 | Borko | B64C 39/024 | 701/3 |
| 2015/0349917 A1* | 12/2015 | Skaaksrud | G06Q 10/0833 | 370/328 |
| 2015/0367956 A1* | 12/2015 | Loussides | B64D 45/04 | 701/11 |
| 2016/0009413 A1* | 1/2016 | Lee | B64F 1/007 | 701/16 |
| 2016/0180618 A1* | 6/2016 | Ho | G07C 9/00563 | 340/5.52 |
| 2016/0196755 A1* | 7/2016 | Navot | G05D 1/0676 | 701/4 |
| 2016/0229530 A1* | 8/2016 | Welsh | B64C 39/024 | |
| 2016/0280393 A1* | 9/2016 | Mouton | B64C 27/006 | |
| 2016/0364678 A1* | 12/2016 | Cao | G06Q 50/30 | |

* cited by examiner

From Fig. 4A → 400

COMMUNICATE WITH UAV
412

CONFIRM LANDING
414

DELIVER PACKAGE
416

LANDING AND DELIVERY ROBOT

BACKGROUND

Unmanned aerial vehicles (UAVs), along with robots and other autonomous machines, are being used to perform tasks that were previously performed by people. For example, a UAV may deliver a package to a residence, for example, instead of a courier. UAVs may enter airspace above a property and deposit a package somewhere on that property.

In some cases, however, the delivery location may lack the space required for a UAV to land. In other cases, the delivery location may lack the security required for the package to be safely delivered. In still other cases, the delivery location can comprise an apartment building, or other high-density residential housing that includes multiple recipients.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples of the present disclosure are related to a delivery robot for use with an unmanned aerial vehicle (UAV) delivery system, among other things. The robot can include a display, speakers, and/or lights to provide messages to bystanders and the UAV, and one or more sensors to provide information to the bystanders and/or an approaching UAV. In some examples, the robot can be stored in a person's home or in a security locker (or "shelter"). In other examples, the robot can be weather resistant and secure, obviating the need for a storage location.

When a user orders products online, for example, the products can be delivered to the user using a UAV. UAVs may be equipped with global positioning system (GPS) navigation, for example, but may require some additional guidance in the landing location. This may be due to some inherent lack of accuracy in GPS guidance systems, for example, or where conditions in the landing area are unknown. To this end, the online ordering system, UAV, and robot can work in concert to communicate with the user, any bystanders, traffic, and other obstacles to enable the UAV to safely and accurately deliver the package to the robot. The robot can then complete the delivery by transporting the package to the user's home, a package locker, or to the shelter for safekeeping. The package can then be retrieved by the user with a key, passcode, fingerprint, or other means.

The techniques, robots, and systems described herein may be implemented in a number of ways. Example implementations are provided below with reference to the following figures.

Figure 1:
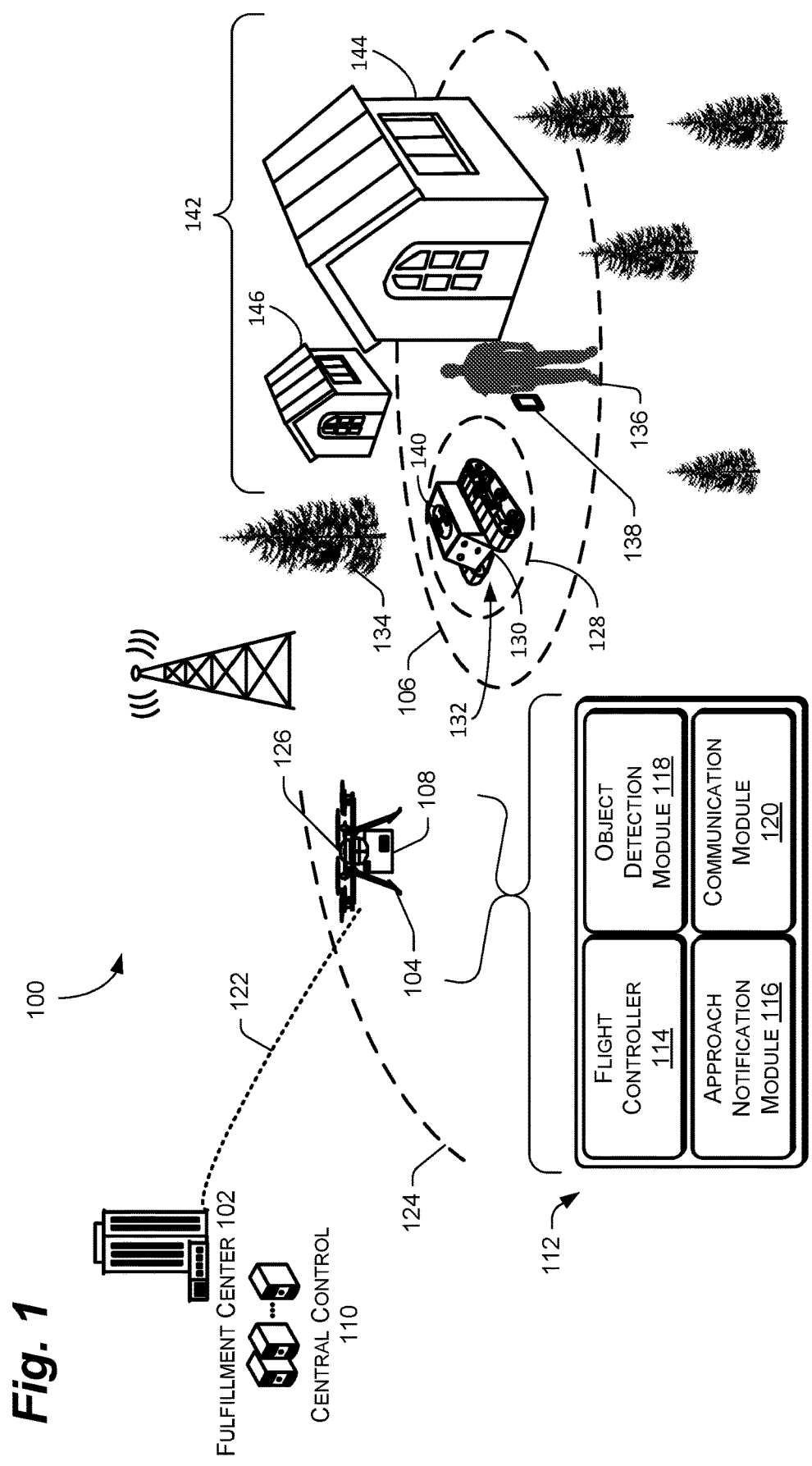
FIG. 1 is a schematic diagram of an illustrative environment that includes an unmanned aerial vehicle (UAV) and delivery robot system, in accordance with some examples of the present disclosure.

FIG. 1 is a schematic diagram of an illustrative delivery system 100 that includes a delivery robot for providing information to an approaching UAV and/or a person at the landing location and for completing the delivery of packages. The delivery system 100 can include a fulfillment center (FC) 102 for receiving orders from customers and for packaging and preparing these orders for shipment. The UAV 104 may originate a flight directed to a delivery location 106 from the FC 102.

In some cases, such as for a delivery, the UAV 104 may be loaded with a package 108 for delivery. In other cases, such as for a return, the UAV 104 may take-off without a payload. The UAV 104 can be provided with data related to the delivery location 106 (e.g., GPS data, routing data, etc.) from a central control 110. The delivery location 106 can be a location associated with a recipient of the package 108 that is being transported by the UAV 104.

As discussed below, however, the delivery location 106 may not be the recipient's actual address, but a designated landing zone 128. In other words, the recipient may live in an apartment building with tens or hundreds of other people. As a result, simply leaving the package in the front yard of the apartment building may be futile. In other examples, the recipient may live in an urban area where there is little, or no, practical open space to land a UAV 104. Thus, the landing zone 128 can be a location that enables the UAV 104 to (1) land and deposit the package or (2) drop the package.

Regardless, the UAV 104 can receive flight information, routes, weather data, and/or commands from the central control 110. The central control 110 can communicate with the UAV 104 via a wireless network, such as a network that utilizes one or more antennas and/or other hardware (e.g., cellular, Wi-Fi, family radio service (FRS), general mobile radio service (GMRS), etc.). The UAV 104 may also, at times, conduct autonomous flight, using GPS, cellular location services, long-range navigation (LORAN), and other navigational means. This may be useful, for example, when the UAV 104 is out of range of both the central control 110 and the delivery location 106.

The UAV 104 may be equipped with a number of components 112 to enable the UAV 104 to perform the delivery of the package 108. The components 112 may include, for example, a flight controller 114, an approach notification module 116, an object detection module 118, and a communication module 120, as well as other components discussed below with reference to FIG. 3.

The UAV 104 may travel, under control of the flight controller 114, along a flight path 122 toward the delivery location 106. Eventually, the UAV 104 may reach or cross a threshold distance 124 from the delivery location 106, which may be detected by the flight controller 114 and/or a navigation system. The UAV 104 may determine that the UAV 104 has reached or crossed the threshold distance 124 from the delivery location 106 based on, for example, GPS data, cellular location services, and/or based on signals received by onboard sensors (e.g., proximity sensors, imaging sensors, transceivers, etc.).

In some examples, the threshold distance 124 may be a certain distance away from, or above, the delivery location 106 (e.g., within 100, 200, or 300 yards). In other examples, the threshold distance 124 may instead be a location over an adjacent property, for example, a point of no return, or other significant location. In some examples, the UAV 104 may be executing, via the flight controller 114, an approach flight maneuver when the UAV 104 reaches or crosses the threshold distance 124.

The UAV 104 may use one or more sensors 126 to detect a landing zone 128 using a delivery robot 130 and other visual, electronic, or navigational clues. As discussed in more detail below, the UAV 104 can use the delivery robot 130 to designate the landing zone 128, provide communications, and to act as a landing pad to deposit the package 108 at the delivery location 106. The delivery robot 130 can designate the landing zone 128 as the top of the delivery robot 130 itself, a location where the package 108 is to be deposited, or a location for the package 108 to be dropped onto to enable the UAV 104 to remain in flight (without landing). The landing zone 128 may be designated by the delivery robot 130 and, in some examples, the delivery robot 130 can provide additional information to the UAV about the landing zone 128 as it approaches.

The delivery robot 130 can be mobile and rugged such that it can maneuver to many locations to assess and/or provide a landing zone 128 for the UAV 104. The sensors 126 (e.g., a camera, radio, or other means) on the UAV 104 may detect the delivery robot 130 in addition to other methods, such as by GPS coordinates or as a specific feature (porch, deck, walkway, etc.). In some examples, the delivery robot 130 can display a bar code, quick-response (QR) code, password, or other encoded information to enable the UAV 104 to verify its own location and to authenticate the delivery robot 130 (e.g., to determine that the UAV 104 has located the correct delivery robot 130 for the package 108).

In some examples, the delivery robot 130 can also communicate flight conditions, landing conditions, and other information either visually on a configurable display (e.g., an LED, electronic ink, or LCD display) or via direct or indirect wireless communications. In some examples, the delivery robot 130 may begin communications with the UAV 104, and may change its display or other output, in response to the UAV 104 crossing the threshold distance 124.

The delivery robot 130 can also include one or more sensors 132, such as a camera or proximity sensor for example, to detect obstacles 134, such as a tree, dog, person, fence, clothesline, traffic, or any other object that may interfere with the UAV 104 at the delivery location 106. The sensors 132 may detect presence of a user 136, who may be a recipient of the package 108, a bystander, a resident at, or near, the delivery location 106, and/or another person. The user 136 may, or may not, be on the property associated with the delivery location 106, but may be located proximate to the property, such as on a neighboring property, a sidewalk or other public property, or at some adjacent location.

The approach notification module 116 may cause the UAV 104 to perform one or more actions during the approach toward the delivery location 106. The approach notification module 116 can inform the delivery robot 130 about intentions and/or actions of the UAV 104 and/or make a request to the person and/or otherwise communicate with the person via the delivery robot 130, possibly using the communication module 120. The approach notification module 116 and/or UAV 104 may cause lights or a screen to be activated on the delivery robot 130 in a predetermined manner to indicate that the UAV 104 is on an approach and intends to land or deposit the package 108 at the delivery location 106.

In some examples, the delivery robot 130 may "announce" the arrival of the UAV 104 via the lights, screen, and/or audio on the delivery robot 130, such as by emitting a warning sound, a pleasant tone, voice commands, or other audio that provides notification of the presence of the UAV 104 and/or an intent of the UAV 104 to deposit the package 108 at the delivery location 106. As discussed below, when space is in short supply, the delivery robot 130 may use flashing lights, sirens, and/or other indicators to close lanes, or other areas, to act as temporary landing zones 128.

In some examples, the delivery robot 130 may project light, patterns, messages, or other information, to provide the UAV 104 and user 136 with information necessary for the UAV 104 to land. For example, the landing zone 128 may not be otherwise marked, but may exist as a GPS coordinate or other location, which can be marked or made visible by the delivery robot 130 displaying a pattern with a laser, light, or other means. On approach, the delivery robot 130 may alternate between a pattern for guiding the UAV 104, an estimated time of arrival (ETA) message for the person, and a warning light for the person to keep clear of the landing zone 128, among other things. In some examples, one or more of the patterns on the delivery robot 130 may contain information relevant to the UAV 104 for approach and/or landing.

In various examples, the approach notification module 116 may inform the delivery robot 130 of the UAV's 104 imminent arrival, position above the landing zone 128, or altitude, among other things. This may cause the delivery robot 130 to change display patterns to display a landing pattern, for example, to provide information, and/or to provide authentication to the UAV 104 (e.g., to verify that the UAV 104 is at, or near, the correct delivery location 106). The landing pattern on the delivery robot 130 may cause the UAV 104 to perform special maneuvers and/or controls based on the conditions at the landing zone 128 (e.g., wind, rain, tilt, or elevation changes). For example, the UAV 104 may have to land in a landing zone 128 that is slightly tilted (or sloped) or in an area with a significant crosswind. The delivery robot 130 can provide local, accurate information to enable the UAV 104 to safely land.

In some examples, the communication module 120 may send and receive messages between the UAV 104 and central control 110 and between the UAV 104 and the delivery robot 130. The delivery robot 130 can, in turn, communicate with the UAV 104 and/or the user 136, including requesting a response from the user 136. For example, in response to the sensors 132 on the delivery robot 130 detecting an obstacle, the delivery robot 130 may (1) provide a message to the UAV 104 to hold its position and (2) display a message to the user 136 to remove the obstacle. If the object is movable (e.g., put a dog in the house, turn off a sprinkler, etc.), the delivery robot 130 may simply ask the user 136 to move or turn off the object. If this object is immovable (e.g., a tree 134) on the other hand, the delivery robot 130 may simply maneuver into a clear location.

The communication module 120 may communicate with the delivery robot 130, the user 136, the central control 110, and other entities by sending wireless signals, including to an electronic device 138 (e.g., cell phone) or computer associated with the user 136. The communication module 120 may send a short message service (SMS) text message, a multimedia messaging service (MMS) message, an email, and/or other type of message, for example, to a web address or phone number associated with the delivery robot 130 or the user 136 (e.g., the recipient of the package, a resident at the delivery location 106, etc.). The communication module 120 may also transmit messages to the delivery robot 130 and/or the electronic device 138 using other techniques and message services, such as via Bluetooth®, Wi-Fi, cellular, and/or via other techniques.

In some examples, the delivery robot 130 may also be connected to a LAN at the delivery location 106 (e.g., a Wi-Fi connection) and may be in communication with the central control 110 and the UAV 104 simultaneously. In this manner, the delivery robot 130 can provide updates to the UAV 104 and/or central control 110 and to act as a relay between the UAV 104 and the central control 110 when the UAV 104 is otherwise out of communication with the central control 110. The delivery robot 130 may belong to the user 136, for example, and be connected to a Wi-Fi connection at the delivery location 106.

As discussed in more detail below (e.g., FIGS. 2C and 4A), in some examples, the delivery robot 130 may display one or more symbols 140 to enable the UAV 104 to land safely at the delivery location 106. In some examples, the delivery robot 130 can include one or more long-distance symbols 140*a* intended to enable the UAV 104 to locate the delivery robot 130 from relatively long distances and to distinguish the delivery robot 130 in the delivery location 106 from other nearby robots 130. The delivery robot 130 can also display a short-distance symbol 140*b* to provide additional information to the UAV 104 related to landing, authentication, and more.

In some examples, the delivery location 106 and the final destination 142 for the package 108 may be in two different locations. In some examples, this may be because the user 136 lives in an apartment building with many other people. In other examples, this may be because the user 136 lives in a crowded urban environment with limited space for a landing zone 128. Regardless, the delivery robot 130 may receive the package 108 in the delivery location 106—e.g., a clearing, a park, the middle of the street, or a common area for an apartment building. The delivery robot 130 can then hold the package 108 internally or deliver it to the final destination 142—e.g., a front stoop on the user's house 144, a locker system, a shelter 146, etc.

Figure 2A:
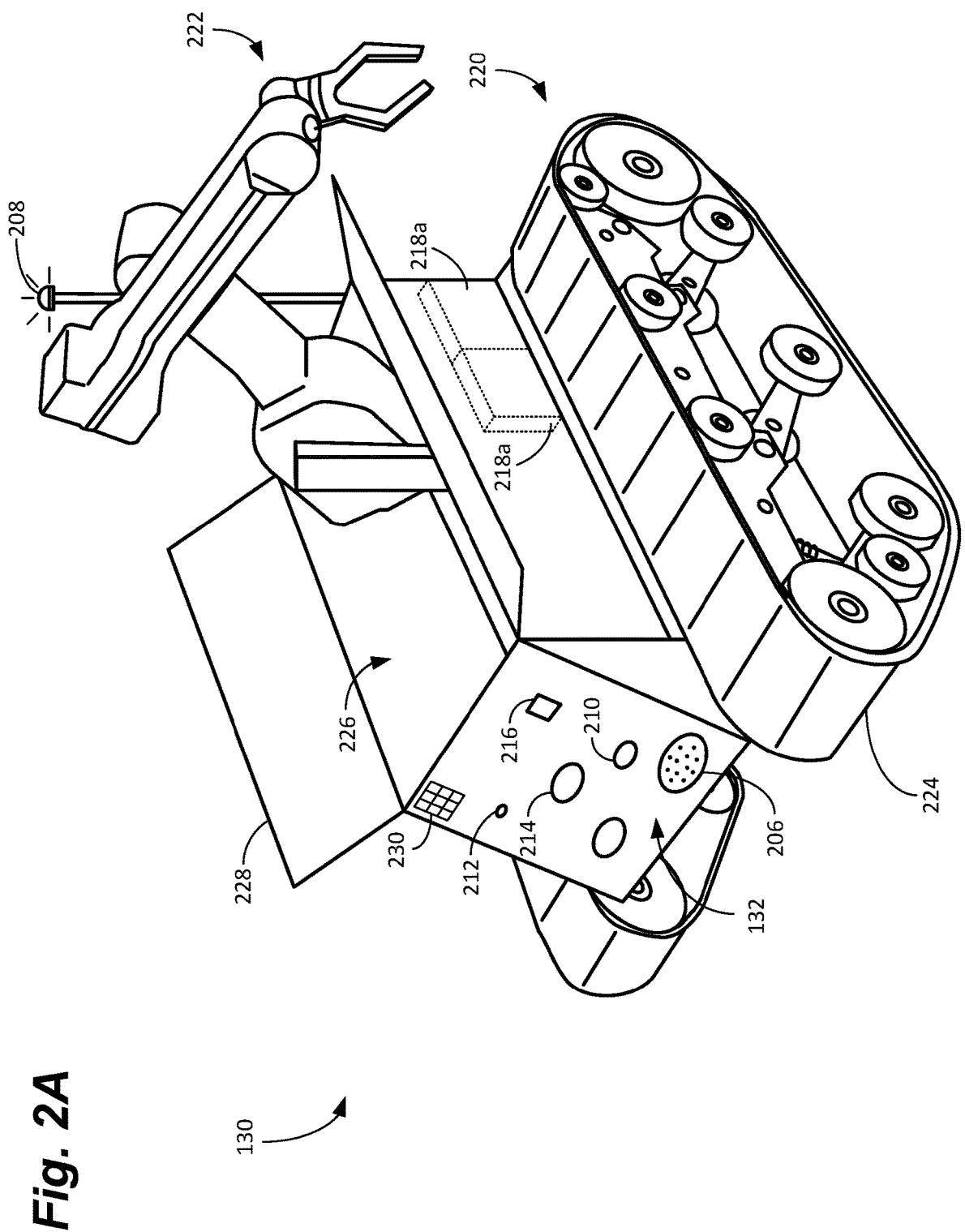
FIG. 2A is a perspective view of an exterior portion of a delivery robot for use with the delivery system of FIG. 1, in accordance with some examples of the present disclosure.
Figure 2B:
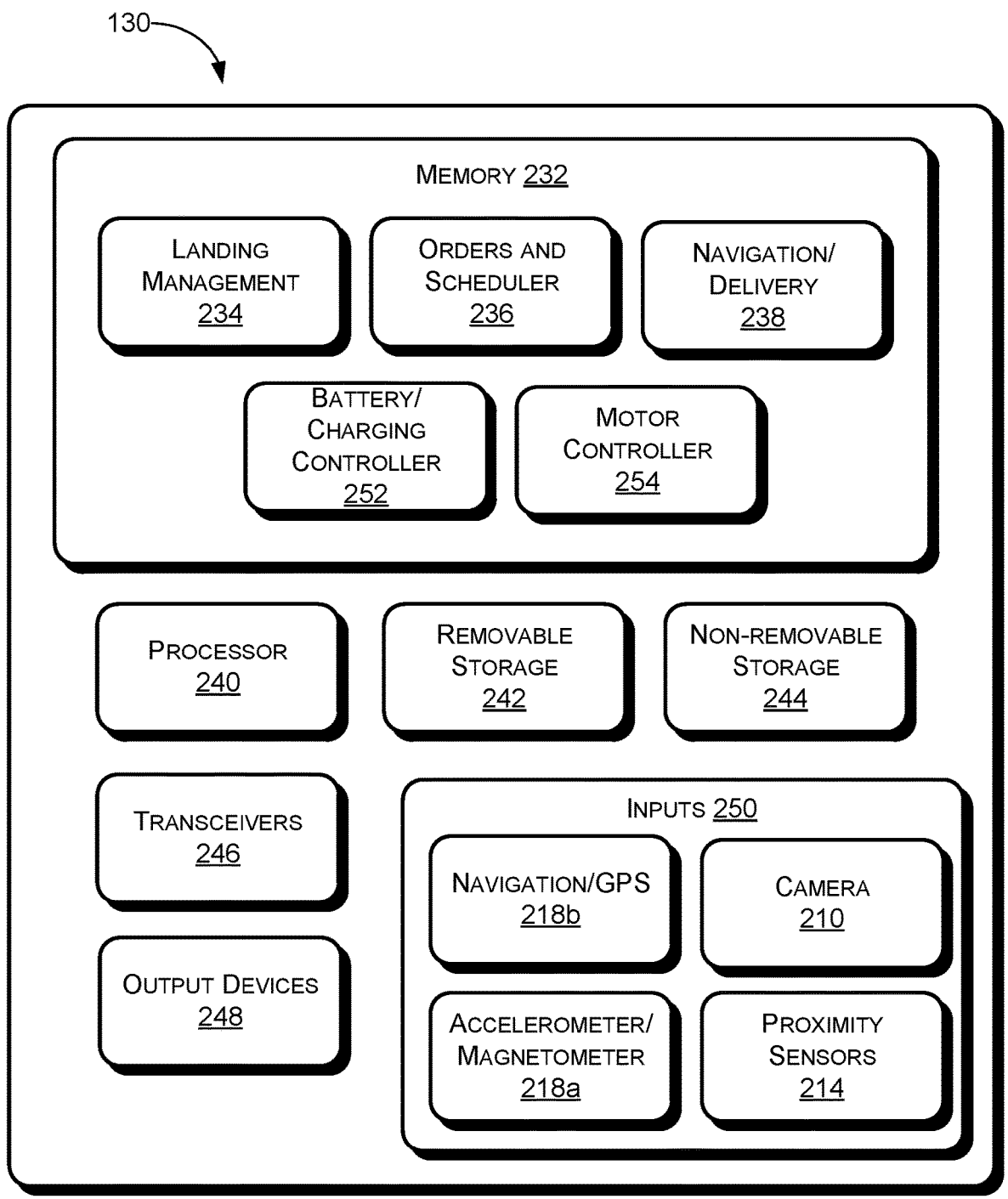
FIG. 2B is a schematic diagram of the components of the delivery robot of FIG. 2A, in accordance with some examples of the present disclosure.
Figure 2C:
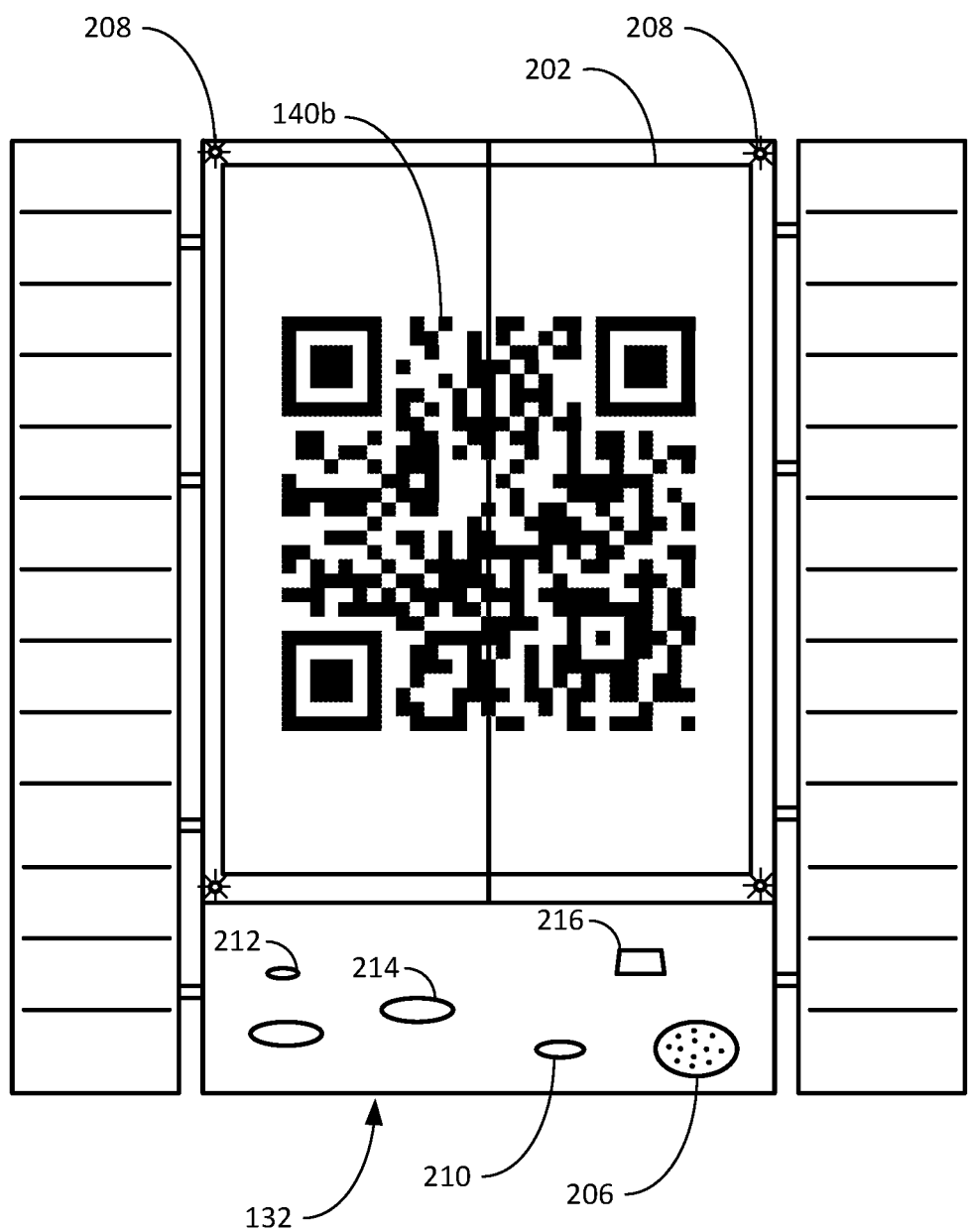
FIG. 2C is a top view of an exterior portion of a delivery robot for use with the delivery system of FIG. 2A, in accordance with some examples of the present disclosure.

As shown in FIGS. 2A-2C, examples of the present disclosure can comprise a delivery robot 130, or simply delivery robot 130, to act as a landing beacon, designate a landing area, and to store and/or perform final delivery of packages 108. The delivery robot 130 can include a number of features to enable it to communicate with the UAV 104, or other vehicles, designed to deliver packages to a location (e.g., a business or home). The delivery robot 130 can also include one or more features to enable it to communicate with a customer, either directly using audio and/or visual messages, or via a wireless network or other means. The delivery robot 130 can provide location information, for example, authentication codes, warning messages, and ETAs, among other things, to the UAV 104, the central control 110, and/or the customer.

The packages 108 may be products ordered from an online retailer, for example, mail, medical supplies, or other goods. As discussed below, the delivery robot 130 can receive/retrieve the packages 108 and then the delivery robot 130 can (1) store them internally (2) return the packages 108 to a secure location for retrieval (3) or deliver them to a final destination (e.g., the user's 136 home or a secure locker system).

As shown, the delivery robot 130 can include a number of external features. The delivery robot 130 can include, for example, a display 202, one or more sensors 132, one or more speakers 206, and one or more external lights 208. In some examples, the display 202 can comprise any standard electronic screen such as, for example, an electronic ink, liquid crystal display (LCD), light emitting diode (LED), or thin-film transistor (TFT) screen. As discussed below, the display 202 can be used to display patterns (e.g., bar codes, landing patterns, or QR codes), provide messages to the user 136 or bystanders (e.g., "Warning: UAV Approaching! Stand Back!"), and to act as a beacon for the UAV 104. As shown and discussed below, the display 202 can also act as a landing pad for the UAV 104.

In some examples, the sensors 132 can include a number of sensors designed to provide information to the delivery robot 130, the UAV 104, the user 136, or bystanders. The sensors 132 can be used to identify issues in the landing zone 128 such as, for example, obstacles, uneven or sloping ground, heavy rain or wind, or other conditions that would prevent a safe landing for the UAV 104. These issues can also include people, traffic, animals, or other objects proximate the landing zone, soft or saturated ground, or lighting conditions that would prevent the UAV 104 from properly locating or identifying the delivery robot 130.

The sensors 132 can comprise one or more cameras 210 to enable the delivery robot 130 to navigate, to survey the landing zone 128, and to determine that there are no obstacles 134 within the landing zone 128, among other things. As discussed below, the cameras 210 can be used to check for traffic on a street, for example, to determine whether the street can be used as a temporary landing zone 128. The cameras 210 can also enable the delivery robot 130 to locate the final destination (e.g., the user's home) and to deposit the package 108 in a predetermined location (e.g., on the front stoop or in the hallway).

In some examples, as discussed below, the sensors 132 can also be light sensors 212. In this manner, the delivery robot 130 can adapt to different light conditions. If it is very bright outside at the delivery time, for example, the delivery robot 130 can increase the contrast and/or brightness of the display 202 to compensate. If a first portion of the display 202 is in the shade and second portion of the display 202 is in the sunlight, on the other hand, the delivery robot 130 can adjust the screen contrast and/or brightness to even the appearance of the display 202 to the UAV 104 or user 136. If it is dark outside, the delivery robot 130 can activate a backlight on the display 202, side lights 208, or other illumination to increase visibility.

In some examples, the sensors 132 can also comprise proximity sensors 214. The proximity sensors 214 can include laser range finders, ultrasonic sensors, or infrared sensors, for example, to enable the delivery robot 130 to determine the distance from itself to other objects. Thus, if there is a tree 134 in the landing zone 128, but there is nonetheless sufficient distance from the delivery robot 130 to the tree 134, then it may be irrelevant to UAV 104 operations, and vice-versa. The proximity sensors 214 may also be used to detect traffic, locate landmarks, and navigate tight areas (e.g., doorways), among other things.

The sensors 132 can also comprise one or more atmospheric or meteorological sensors 216 to provide data related to moisture, humidity, rainfall, wind speed and direction, barometric pressure, and/or other atmospheric or weather-related sensors to provide feedback about the conditions in the landing zone 128. If the grass is wet in the landing zone 128, for example, the UAV 104 may exercise extra care during landing to prevent slippage and/or water damage to the package 108. Similarly, if the meteorological sensors 216 indicate that the ground is saturated due to recent rainfall, the UAV 104 may drop the package on, or near, the delivery robot 130 without landing. If the meteorological sensors 216 detect winds above a predetermined speed, on the other hand, the delivery robot 130 may tell the UAV 104 to abort the delivery, or "wave off."

The sensors 132 can also comprise a tilt sensor, gyro, or accelerometer 218a to indicate when the delivery robot 130 is on uneven ground, for example, dropping down off a curb, or when the delivery robot 130 is moving. If the ground is significantly sloped, for example, the UAV 104 may be unable to safely land. In this case, the delivery robot 130 may move to flatter ground, activate a leveling system, or make other adjustments. Similarly, if the delivery robot 130 detects that it is moving (e.g., sliding on slippery ground), the delivery robot 130 may send a message to the UAV 104 to pause or abort until the delivery robot 130 is repositioned and stationary.

The delivery robot 130 can also include a GPS receiver 218b. The GPS receiver 218b can include a receiver and an antenna to enable the delivery robot 130 to locate, and navigate between, at least the delivery location 106 and the final destination 142. In some examples, the GPS receiver 218b can also enable the delivery robot 130 to provide location information to the UAV 104 and/or central control 110.

In some examples, the speakers 206 can provide audio output for the delivery robot 130 to enable the delivery robot 130 to communicate with the user 136 or other bystanders. The speakers 206 can be used to provide the user 136 with instructions, for example, to alert the user 136 to an impending delivery, or to alert bystanders that an area is temporarily closed. The speakers 206 can enable the delivery robot 130 to ask the user 136, "Please stand back 10 feet," or to alert the user 136, "Please stand back, UAV approaching." The speakers 206 can also provide music, tones, warning chimes, and other audio to provide information to the user 136.

As shown, the delivery robot 130 can also include a drive system 220 and a package manipulator 222. As shown, the drive system 220 can include one or more tracks 224 and one or more drive wheels, idlers, and other components. The drive system 220 can also include one or more motors, motor controllers, batteries, chargers, and other means to enable the delivery robot 130 to travel.

While shown as a tracked vehicle, the delivery robot 130 can take many forms. Provided the drive system 220 is adapted to the relevant environment, its design is somewhat immaterial. In some environments, such as in cities, for example, a tracked vehicle (shown) or a multi-wheeled "rover" type vehicle can enable the delivery robot 130 to traverse curbs, stairs, and other obstacles. In rural environments, on the other hand, a vehicle with large tires and four-wheel drive may be preferred to travel on dirt roads or across fields.

The package manipulator 222 can comprise a robotic arm (shown), paddles, magnets, suction devices, or other suitable means to retrieve and/or secure packages 108. In some examples, the package manipulator 222 can enable the delivery robot 130 to retrieve packages 108 from the ground, for example, and place them inside, or on top of, the delivery robot 130. Thus, the package manipulator 222 can comprise a scoop, ramps, arms, or any suitable mechanism to place the package 108 in, or on, the delivery robot 130.

In some examples, the delivery robot 130 can also define an internal storage bay 226 with one or more bay doors 228. This can enable the delivery robot 130 to store and/or secure packages 108 in the storage bay 226. In some examples, some, or all, of the robot's 130 components, including the storage bay 226 can be weathertight to enable the delivery robot 130 to operate outside in any weather conditions. Thus, when it is raining or snowing outside or the grass is wet with dew, the delivery robot 130 can continue to function without damage and can protect the package 108 until final delivery.

In some examples, rather than having a package manipulator 222, the bay doors 228 themselves can enable the package 108 to enter the storage bay 226. In other words, in some examples, the bay doors 228 can open inward to enable the package 108 to fall into the storage bay 226. In this manner, after the package 108 is placed on top of the robot 130 by the UAV 104, for example, the bay doors 228 can simply open inward until the package 108 falls into the storage bay 226.

In some examples, the delivery robot 130 may retrieve the package 108 and then store it for later retrieval by the user 136. In this configuration, the storage bay 226 can be weathertight to prevent damage to the package 108. In some examples, the storage bay 226 can also be suitably tough to prevent unauthorized retrieval of the package 108. Thus, the sides 226a of the storage bay 226 and the bay doors 228 may be locked, armored, or otherwise secure.

In this vein, the delivery robot 130 can also include an access control device 230. The access control device 230 can comprise, for example, a keypad (shown), a fingerprint scanner, a combination lock, or other means for preventing unauthorized access to the storage bay 226. In this configuration, the delivery robot 130 can retrieve the package 108 from the delivery location 106 and then return to the final destination (e.g., the user's 136 stoop) and wait for the user 136 to access the storage bay 226 with the access control device 230. In this manner, the delivery robot 130 can essentially act as a mobile storage locker for the package 108.

As shown in FIG. 2B, the delivery robot 130 can also comprise one or more internal components to enable the delivery robot 130 to perform its functions. As discussed below, the delivery robot 130 can comprise memory 232 configured to include computer-executable instructions including at least a landing management module 234, an order and scheduling module 236, and a navigation/delivery module 238. The delivery robot 130 can also include one or more processor(s) 240, removable storage 242, non-removable storage 244, transceivers 246, output device(s) 248, and input device(s) 250. The delivery robot 130 may additionally contain a policy engine to receive, create, transmit, and manage the various messages and commands.

In various implementations, the memory 232 can be volatile (such as RAM), non-volatile (such as ROM, flash memory, etc.), or some combination of the two. The memory 232 can also comprise the landing management module 234. The landing management module 234 can be used instead or, or in addition to, the navigation systems on the UAV 104. In some examples, upon receiving a notification from the UAV 104 that the UAV 104 has crossed the threshold distance 124, the delivery robot 130 can begin displaying messages relevant to the user 136 and the UAV 104. The delivery robot 130 may flash between a message to the user 136 to stand back, for example, and a landing symbol for the UAV 104 to direct the landing process. In some examples, the delivery robot 130 may display information to the UAV 104 regarding current wind, temperature, and other atmospheric conditions, authentication data, and other relevant information.

In some examples, upon receiving a message that the UAV 104 has crossed the threshold distance 124, landing management module 234 in the delivery robot 130 may take over control of the UAV 104 to guide it to land on, or near, the delivery robot 130. At that point, the UAV 104 may simply provide location, altitude, and other relevant information to the delivery robot 130 and receive commands from the delivery robot 130 to affect the landing. This outsourcing may enable the UAV 104 to be lighter, simpler, and/or cheaper due to the reduced processing requirements.

In some examples, the memory 232 can also include the orders and scheduling module 236. As the name implies, the orders and scheduling module 236 can receive information from the central control 110, for example, related to the orders and delivery schedule for the user 136, or users. The delivery robot 130 can work in concert with the central control 110 and the UAV 104 to coordinate deliveries and ensure that the UAV 104 is not forced to attempt a delivery without the delivery robot 130 being in the delivery location 106 and available.

The memory 232 can also include a navigation and delivery module 238. The navigation and delivery module 238 can enable the delivery robot 130 to navigate to the delivery location 106, receive/retrieve the package, and then deliver the package to the final destination 142. Thus, the navigation and delivery module 238 can make use of the GPS receiver 218b, for example, to navigate from the delivery location 106 to the final destination 142.

The navigation and delivery module 238 can comprise the GPS receiver 218b, for example, a cellular transceiver with location services, a LORAN, or other navigational devices. The delivery robot 130 can also use the navigation and delivery module 238 to determine if it is properly placed outside for a UAV 104 approach, for example, to provide location information to the UAV 104 or central control 110, and/or to provide verification information to the UAV 104 (e.g., that the location of the delivery robot 130 is coincident to the delivery location 106).

In some implementations, the processor(s) 240 can comprise a central processing unit (CPU), a graphics processing unit (GPU), or both a CPU and a GPU, or any other sort of processing unit. The processor 240 can be responsible for running software on the delivery robot 130, including the aforementioned modules 234-238 and to interpret and send messages to the central control 110 and UAV 104. In some examples, the processor(s) 240 can also perform calculations and provide instructions to the user 136 and the UAV 104 based on the various inputs 250, discussed below.

The delivery robot 130 can also include additional data storage devices (removable and/or non-removable) such as, for example, magnetic disks, optical disks, or tape. Such additional storage is illustrated in FIG. 2B by removable storage 242 and non-removable storage 244. The removable storage 242 and non-removable storage 244 can store the various modules, programs, and algorithms for the navigation, landing, and orders processes and can include routines for scheduling and canceling deliveries, among other things.

Non-transitory computer-readable media may include volatile and nonvolatile, removable and non-removable tangible, physical media implemented in technology for storage of information, such as computer readable instructions, data structures, program modules, or other data. The memory 232, removable storage 242, and non-removable storage 244 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the delivery robot 130. Any such non-transitory computer-readable media may be part of the delivery robot 130 or may be a separate device (e.g., a jump drive) or a separate database or databank (e.g. at the central control 110).

In some implementations, the transceivers 246 can include any sort of transceivers known in the art. For example, the transceivers 246 may include wired communication components, such as a wired modem or Ethernet port, for communicating with a LAN at the delivery location 106. Also, or instead, the transceivers 246 may include wireless modem(s) to facilitate wireless connectivity with the LAN, the central control 110, the UAV 104, the Internet, and/or an intranet. Further, the transceivers 246 may include a radio transceiver that performs the function of transmitting and receiving radio frequency communications via an antenna (e.g., Wi-Fi or Bluetooth®).

In some implementations, the output devices 248 can include any sort of output devices known in the art, such as the display 202 (e.g., an LCD, LED, or TFT screen), a touchscreen display, lights 208, speakers 206, a vibrating mechanism, or a tactile feedback mechanism to provide interactive feedback to the user 136 and/or the UAV 104. In some examples, the output devices 248 can play various sounds based, for example, on whether the landing area is safe to enter, the UAV 104 is landing or has landed, or if there is an object preventing the UAV 104 from landing. Output devices 248 also include ports for one or more peripheral devices, such as headphones, peripheral speakers, or a peripheral display.

In various implementations, input devices 250 can include any sort of input devices known in the art. For example, input devices 250 may include the camera 210, a microphone, a keyboard/keypad/touchpad, a touch-sensitive display 202, a proximity sensor 214, and a tilt sensor, magnetometer, or accelerometer 218a. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input devices 250 can also include the access control device 230.

In some examples, the delivery robot 130 can also comprise a battery/charging controller 252 and a motor controller 254. As the name implies, the battery/charging controller 252 can manage the onboard power source for the delivery robot 130. This can include batteries and a charger, for example. As discussed above, in some examples, the shelter 146 can include a battery charger and the battery/charging controller 252 can monitor battery charge and ensure that the delivery robot 130 always has sufficient battery charge to, at minimum, return to the shelter 146.

The motor controller 254 can control one or more motors on the delivery robot 130. The delivery robot 130 can include one or more drive motors, for example, as part of the drive system 220 to power drive wheels, tracks 224, legs, or other propulsion systems. The delivery robot 130 can also include one or more motors to open and close the bay doors 228. As discussed above, the delivery robot 130 can also include a motor to extend and retract one or more of the lights 208 on the delivery robot 130.

As shown in FIG. 2C, in some examples, the delivery robot 130 can use the display 202 and the lights 208 for communication with the user 136, bystanders, and the UAV 104. In some examples, the delivery robot 130 may provide various symbols 140 on the display 202. This can include symbols 140 to enable the UAV 104 to locate the delivery robot 130 from a distance. This can also include symbols 140b, such as quick response (QR) codes (shown), bar codes, or other symbols designed to provide information to the UAV 104. Thus, the symbols 140 can enable the UAV 104 to authenticate the delivery robot 130 and vice-versa. The symbols 140 can also provide information regarding the landing zone 128, meteorological data, and other information.

The lights 208 can also enable the UAV 104 to locate the delivery robot 130. So, for example, the lights 208 can comprise one or more strobe lights, for example, that can be seen from long distances. The lights 208 can also enable the delivery robot 130 to alert the user 136 and bystanders to an approaching UAV 104, to close a lane of traffic, or to close the landing zone 128. In some examples, the lights 208 can be used to provide the UAV 104 with a go/no-go. If the lights 208 remain green during an approach, for example, the UAV 104 is cleared to land. If the lights 208 change to red, on the other hand, this can indicate a wave-off of the UAV 104 by the delivery robot 130.

In some examples, one or more of the lights 208 can be retractable. In this configuration, one or more of the lights may be mounted on a retractable stalk, similar to a vehicle antenna, to enable the lights 208 to be deployed in certain situations. In some examples, a street may be used as a landing zone 128. In this configuration, the delivery robot 130 may drive into the street, raise one or more of the lights 208 to close the street for a delivery, for example, and then retract the light to reopen the street after delivery.

Figure 2D:
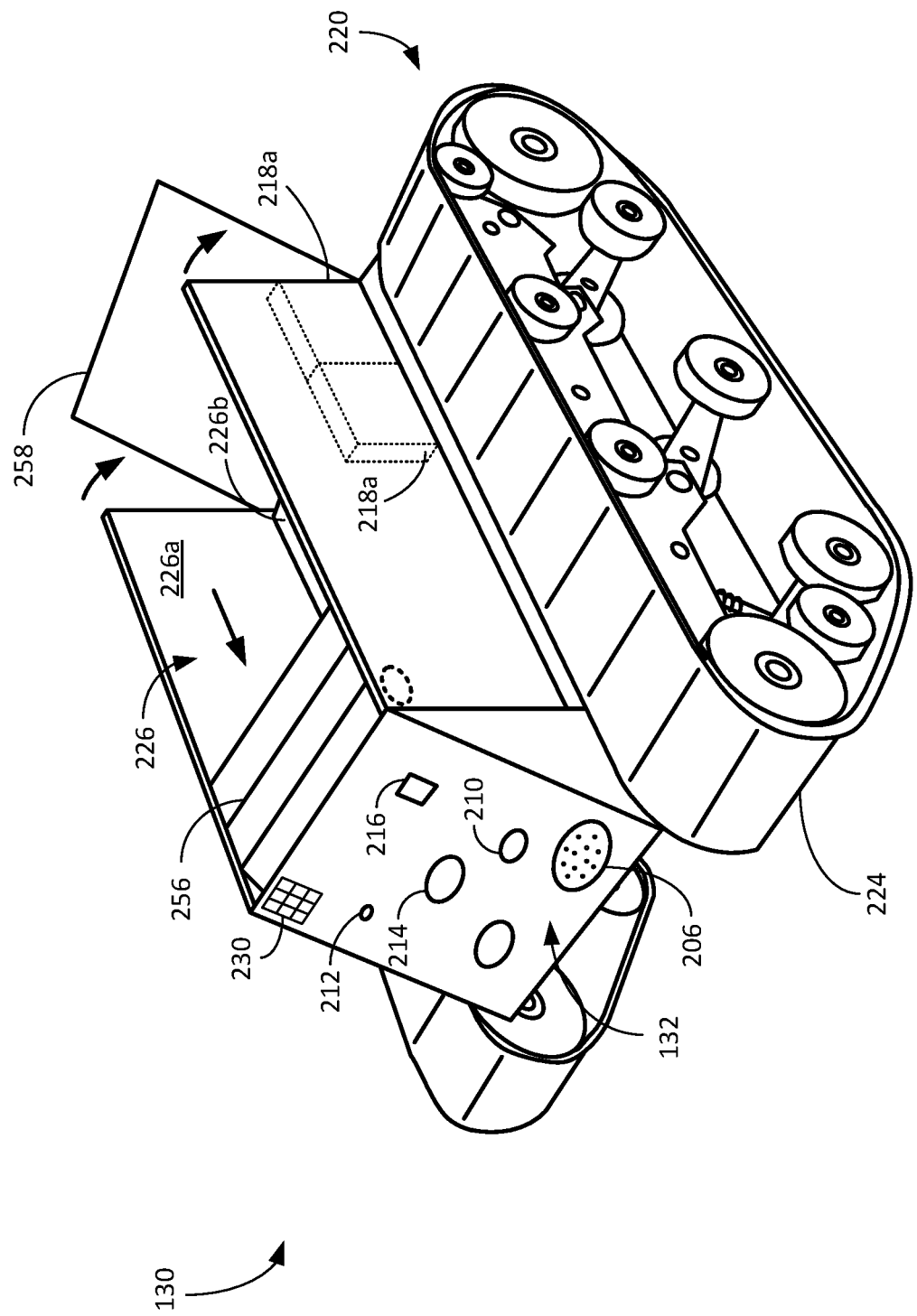
FIG. 2D is a perspective view of an exterior portion of a delivery robot with a rear hatch and rollup door, in accordance with some examples of the present disclosure.

As shown in FIG. 2D, in some examples, rather than using a package manipulator 222, or other device, the robot 130 can comprise, for example, a rollup door 256 and a rear hatch 258. In this configuration, if the package 108 is placed on top of the robot 130, then the rollup door 256 can open to enable the package 108 to fall into the storage bay 226. The rollup door 256 can include one or more motors 256a to furl and unfurl the door 256 in a controlled manner.

To unload the package 108, on the other hand, the rear hatch 258 can open, to enable the package 108 to fall out of the back of the robot 130 and onto the ground or floor. In some examples, the storage bay 226 may tilt to facilitate this motion. In other examples, the robot 130 can simply accelerate quickly to cause the package 108 to fall out the hatch 258.

Of course, other mechanisms are possible. In some examples, the floor 226b of the storage bay 226 can comprise an elevator. In this configuration, the floor 226b can be placed in an extended position—such that it is substantially level with the top of the robot 130—to receive the package 108. The floor 226b can then move into a retracted position such that the package 108 is placed inside the storage bay 226. To drop the package 108, the robot 130 can then open the rear hatch 258, or move the floor 226b into the extended position, and accelerate to cause the package 108 to fall off the robot 130. Because the robot 130 is close to the ground, this method can be used for all but the most delicate packages 108—which may not be deliverable by UAV 104 in the first place.

Figure 2E:
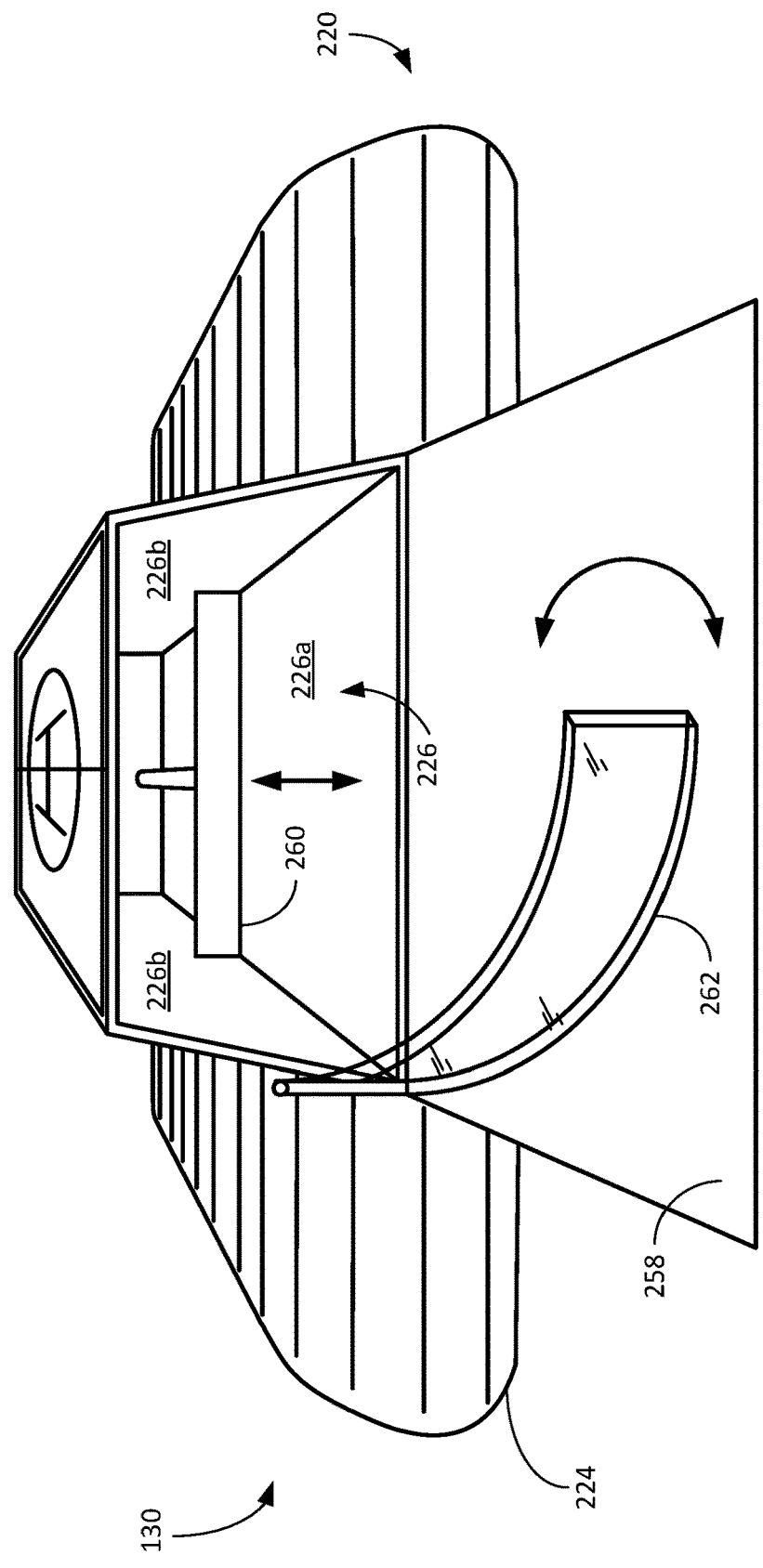
FIG. 2E is a rear view of an exterior portion of a delivery robot with a rear hatch, pusher, and paddle, in accordance with some examples of the present disclosure.

As shown in FIG. 2E, the robot 130 could also comprise a simple scoop, or use the rear hatch 258 as a ramp. In this configuration, the robot 130 can simply drive towards the package 108 at speed to "scoop" it up, for example, or trap the package 108 between the robot 130 and a wall to scoop it up. In other examples, the robot 130 could comprise one or more paddles 260 to corral the package into the storage bay 226. The paddle 260 can comprise a simple pivoting arm, for example, to pull the package 108 into the storage bay 226.

In some example, the robot 130 can also comprise a pusher 262, or similar, to push packages out of the back of the robot 130. The pusher 262 can comprise a blade and an actuator, such as a hydraulic actuator or linear actuator, for example, to push the package 108 out of the storage bay 226. When not in use, the pusher 262 can move into a retracted position and be stored in the front of the storage bay 226 out of the way.

In other examples, the storage bay 226 could tilt, like a dump truck, to enable packages to be "poured" out the back of the robot 130. In still other examples, the floor of the storage bay 226 could be spring-loaded to enable packages 108 to be ejected out of the bay doors 228. In this configuration, at the final destination, the bay doors 228 can be opened and the spring released to eject the package 108. Of course, this may be practical only with fairly robust and/or well-padded packages 108.

Figure 3:
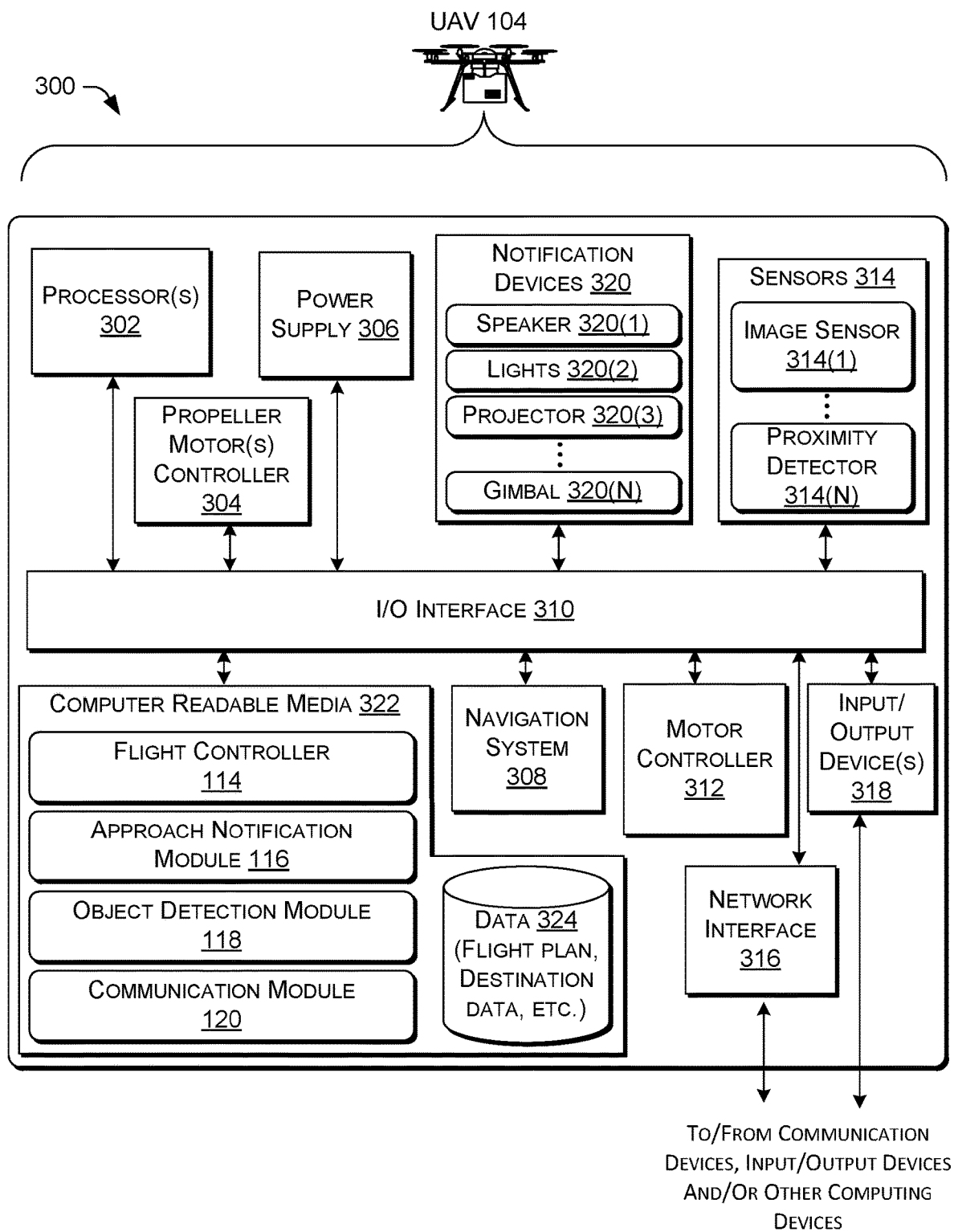
FIG. 3 is a schematic diagram of the UAV, in accordance with some examples of the present disclosure.

FIG. 3 is a block diagram of an illustrative UAV architecture 300 of the UAV 104. The UAV architecture 300 may be used to implement the various systems, devices, and techniques discussed above. In the illustrated implementation, the UAV architecture 300 includes one or more processors 302, a propeller motor controller 304, power supply module 306, a navigation system 308, and an input/output (I/O) interface 310. The UAV architecture 300 can also include a motor controller 312 to interact with the package 108, sensors 314, a network interface 316, one or more input/output devices 318, and notification devices 320.

In various implementations, the UAV architecture 300 may be implemented using a uniprocessor system including one processor 302, or a multiprocessor system including several processors 302 (e.g., two, four, eight, or another suitable number). The processor(s) 302 may be any suitable processor capable of executing instructions. In various implementations, the processor(s) 302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 302 may commonly, but not necessarily, implement the same ISA.

The propeller motor controller 304 communicates with the navigation system 308 and adjusts the power of each propeller motor to guide the UAV 104 along a determined flight path 122. The power supply module 306 may control the charging and any switching functions associated with one or more power modules (e.g., batteries) of the UAV 104.

The navigation system 308 may include a GPS or other similar system that can be used to navigate the UAV 104 to and/or from a location. The motor controller 312 communicates with the actuator(s) or motor(s) (e.g., a servomotor) used to engage and/or disengage the package 108 and other cargo. When the UAV 104 is positioned over a level surface at a delivery location, for example, or has landed on the delivery robot 130, the motor controller 312 can provide an instruction to a motor that controls cargo arms, for example, to release the package 108.

In one implementation, the I/O interface 310 may be configured to coordinate I/O traffic between the processor(s) 302, the non-transitory computer readable media 322, the network interface 316, or other peripheral interfaces, such as input/output devices 318. In some implementations, the I/O interface 310 may perform any necessary protocol, timing, or other data transformations to convert data signals from one component (e.g., the non-transitory computer readable media 322) into a format suitable for use by another component (e.g., the processor(s) 302). In some implementations, the I/O interface 310 may include support for devices attached through various types of peripheral buses, such as a variant of the Peripheral Component Interconnect (PCI) bus standard, for example, or the Universal Serial Bus (USB) standard. In some implementations, the function of the I/O interface 310 may be split into two or more separate components, such as, for example, a north bridge and a south bridge. Also, in some implementations, some or all of the functionality of the I/O interface 310, such as an interface to the non-transitory computer readable media 322, may be incorporated directly into the processor(s) 302.

The sensors 314 may include an image sensor 314(1), a proximity sensor 314(N), and/or other sensors used to detect obstacles 134, the delivery robot 130, the user 136, and/or other items or objects. The sensors 314 may monitor actions performed by the user 136, for example, to indicate a response by the user 136 to a request issued by the UAV 104 or the delivery robot 130 (e.g., "Please move away from the robot.").

The network interface 316 can be configured to allow data to be exchanged between the UAV architecture 300, other devices attached to a network, such as a computer at the user's house, the central control 110, the delivery robot 130, and/or with UAV control systems of other UAVs 104. The network interface 316 may enable wireless communication between numerous UAVs, for example. In various implementations, the network interface 316 may support communication via wireless general data networks, such as a Wi-Fi or Bluetooth® network. In some examples, the network interface 316 may support communication via telecommunications networks such as cellular communication networks, satellite networks, and the like.

The input/output devices 318 may, in some implementations, include accelerometers, altimeters, thermometers, tilt sensors, gyros, and/or other input/output devices commonly used in aviation. Multiple input/output devices 318 may be present and controlled by the UAV architecture 300. One or more of these sensors may be utilized to assist in landings as well as avoiding obstacles during flight.

The notification devices 320, which may be used for other purposes and may be a subset of the input/output devices 318, may include additional input/output devices. The notification devices 320 may include one or more of a speaker 320(1), lights 320(2), a projector 320(3), and/or a moveable mechanism (e.g., a gimbal component) 320(N). The moveable mechanism 320(N) may be any mechanism that enables the directing of a component on the UAV 104 to "point" in a particular direction, among other possible reasons/functions. The notification devices 320 may be used by approach notification module 116, the object detection module 118, and/or the communication module 120, as discussed herein.

The non-transitory computer readable media 322 may be configured to store executable instructions/modules, data, flight paths, and/or data items accessible by the processor(s) 302. In various implementations, the non-transitory computer readable media 322 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data, and/or flight paths may be received, sent, or stored on different types of computer-accessible media, such as non-transitory media, or on similar media separate from the non-transitory computer readable media 322. Generally speaking, a non-transitory, computer readable memory may include storage media or memory media such as flash memory (e.g., solid-state memory), magnetic or optical media (e.g., disk) coupled to the UAV architecture 300 via the I/O interface 310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 316.

In some examples, the non-transitory computer readable media 322 may store the flight controller 114, the approach notification module 116, the object detection module 118, and the communication module 120. The components may access and/or write data 324, which may include flight plan data, log data, destination data, delivery times, missed deliveries, errors, and so forth. The operation of the flight controller 114, the approach notification module 116, the object detection module 118, and the communication module 120 are described above, and below by way of various illustrative processes.

Figure 4A:
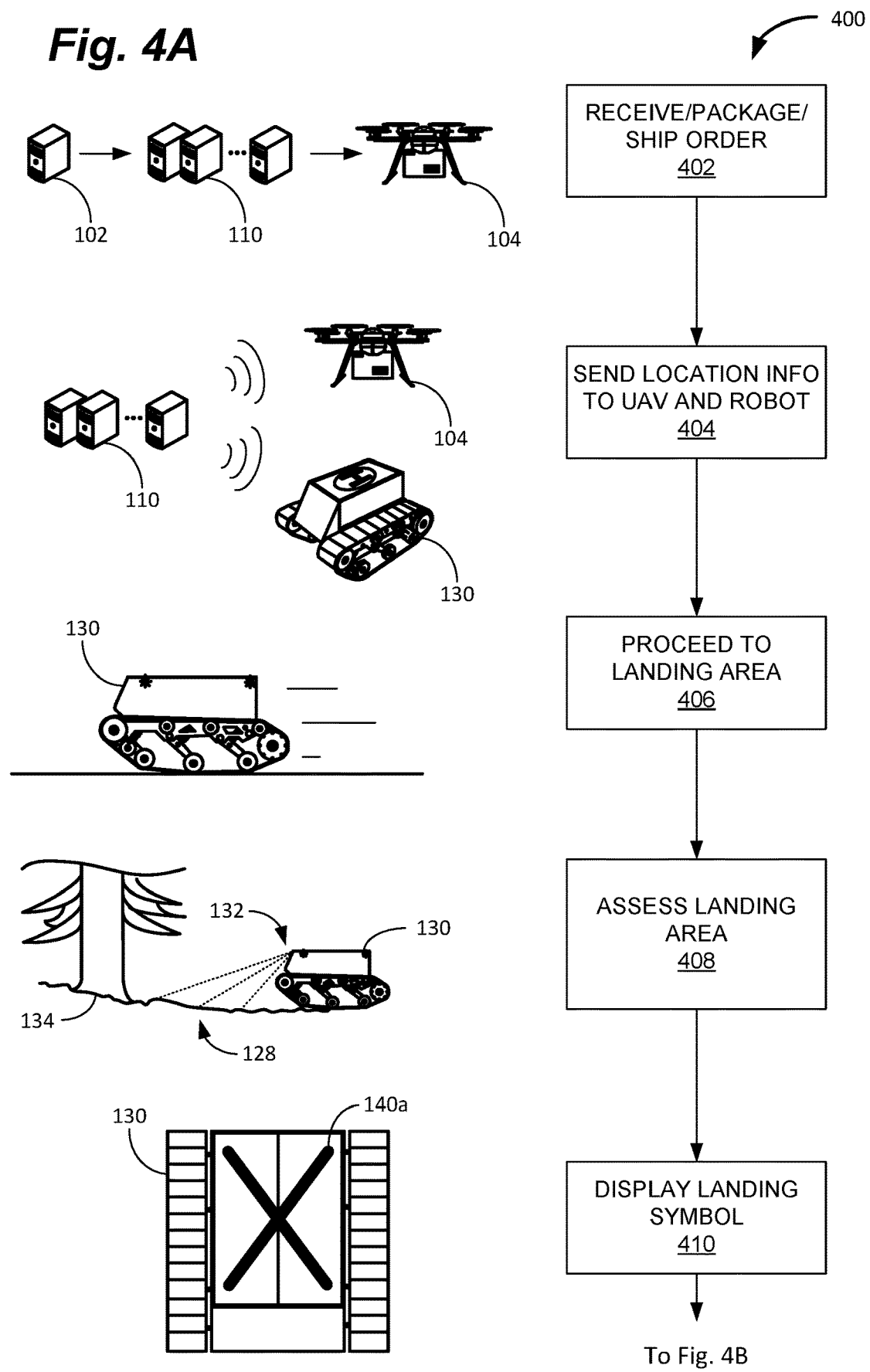
FIGS. 4A and 4B are flowcharts depicting a landing process for the UAV using the delivery robot, in accordance with some examples of the present disclosure.
Figure 4B:
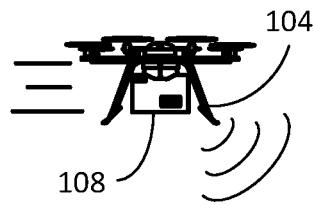
Figure 4B:
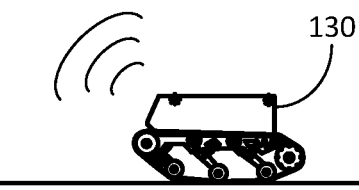
Figure 4B:
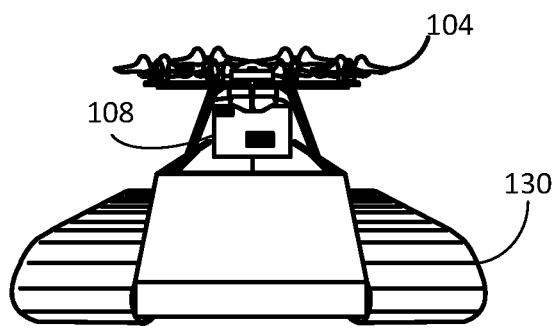
Figure 4B:
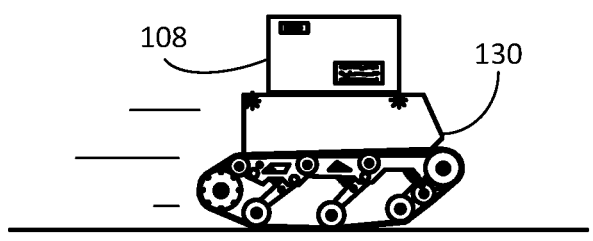

As shown in FIGS. 4A and 4B, examples of the present disclosure can also comprise a process 400 to deliver packages to a location via the UAV 104. At 402, the user 136 can order one or more products from an online retailer FC 102, for example, that will be delivered via the UAV 104. The FC 102 can process and package the products in the normal manner in preparation for delivery by the UAV 104. This can include, placing all of the products in a single package, for example, labeling and addressing the package 108, and attaching the package 108 to the UAV 104 for delivery.

At 404, the FC 102 can provide delivery information to the UAV 104 and/or to the delivery robot 130. For the UAV 104, this can include the delivery location 106, for example, package weight, fragility (e.g., whether the package can be dropped or must be placed, and any relevant drop heights) any routing or weather information, and the scheduled delivery time. The central control 110 can also provide the UAV 104 with the address of the delivery robot 130 (e.g., a URL, IP, or e-mail address) and any authentication information to enable the UAV 104 to locate and authenticate the proper delivery robot 130.

Similarly, the central control 110 can provide package 108 information to the delivery robot 130, along with information related to the UAV 104. This can include, for example, package weight and size, the estimated delivery time, and UAV 104 information. The central control 110 may also provide identification and/or authentication information for the UAV 104 to the delivery robot 130. This may include an address for the UAV 104 (e.g., a URL, IP, or e-mail address), a radio frequency, a tail number, or other information to enable the delivery robot 130 to identify and verify the UAV 104, and vice-versa.

At 406, at a predetermined time prior to delivery, the delivery robot 130 can proceed to the delivery location 106. As mentioned above, the delivery robot 130 may have a storage location (e.g., the shelter 146) and then move to the delivery location 106. The delivery location 106 can be a common area (e.g., a courtyard) for an apartment building, a public park, the street, a rooftop, a clearing, or other suitable landing zone 128.

At 408, the delivery robot 130 can assess the landing zone 128. As discussed above, the delivery robot 130 can use one or more sensors 132 to determine that (1) the delivery robot 130 is on, or near, suitably level, firm ground and (2) that the landing zone 128 is substantially unobstructed, free from traffic, bystanders, etc. The delivery robot 130 can include cameras 210, proximity sensors 214 (e.g., laser scanners), and other sensors to determine whether any obstacles are in the landing flight path for the UAV 104. As discussed below, in some examples, if the delivery robot 130 determines that the landing zone 128 is not clear, it may send a message to the UAV 104 or the central control 110 to prevent the UAV 104 from taking off or landing.

In other examples, the delivery robot 130 may determine that the landing zone 128 is obstructed, crowded, or otherwise unsuitable. In this case, the delivery robot 130 can locate a second landing zone 128 proximate the first landing zone 128 that is suitable for the UAV 104. After locating a suitable second landing zone 128, the delivery robot 130 can relay the second landing zone 128 to the UAV 104 the central control 110, or both. This can prevent the UAV 104 from aborting the delivery simply by moving the landing zone 128 slightly.

At 410, in some examples, once the delivery robot 130 has determined that it is in the correct location and in an appropriate flat and obstruction free landing zone 128, the delivery robot 130 can display one or more symbols 140. The delivery robot 130 may initially display a long-distance symbol 140*a* for the UAV 104. As the name implies, this can be a relatively simple and/or high-contrast symbol to enable the UAV 104 to initially locate and/or identify the correct delivery robot 130. In some examples, the long-distance symbol 140*a* can comprise a large letter provided to the delivery robot 130 by the central control 110 or the UAV 104. In this manner, the UAV 104 can locate the robot that is displaying an "X," for example, which differentiates it from a neighboring delivery robot 130 displaying an "M."

In some examples, the long-distance symbol 140*a* can be provided to the delivery robot 130 by the central control 110 at the time the order is placed or sometime thereafter (but before the UAV 104 is scheduled to arrive). The delivery robot 130 can display the long-distance symbol 140*a* beginning at a predetermined time before the UAV's 104 ETA (e.g., 5, 10, or 15 minutes), for example, or any time after the delivery robot 130 has arrived in the delivery location 106. In some examples, the delivery robot 130 can display the long-distance symbol 140*a* until the UAV 104 and the delivery robot 130 are within communication range. In other examples, the delivery robot 130 can display the long-distance symbol 140*a* until the ETA for the UAV 104, or a predetermined time before the ETA.

At 412, in some examples, the delivery robot 130 can also communicate with the UAV 104 and/or the central control 110 to indicate that it is ready to receive the UAV 104. In some examples, the UAV 104 may not leave the FC 102 until it has received this message from the delivery robot 130 or the central control 110 to reduce the number of failed deliveries. In other words, if the UAV 104 leaves with the package 108, but the delivery robot 130 is not outside or appropriately placed, then the UAV 104 may be unable to land at the delivery location 106 and may be forced to return to the FC 102 without delivering the package. This is obviously a waste of time and energy for the UAV 104 and the delivery system 100.

In other examples, the delivery robot 130 can also provide periodic updates to the central control 110 or UAV 104 when the UAV 104 is en route. If the landing zone 128 becomes obstructed (e.g., traffic picks up), for example, the delivery robot 130 can send a message to the UAV 104 to abort the delivery. In some cases, depending on whether the UAV 104 has crossed the threshold distance 124 (or some other boundary), for example, the UAV 104 may continue on its flight path 122 in the hope that the issue can be cleared by the delivery robot 130 or the user 136 prior to arrival. In some examples, the delivery robot 130 can also provide final landing authority to the UAV 104 when it arrives on-scene. Regardless, the UAV 104, central control 110, and delivery robot 130 can be in communication to provide periodic or real-time updates of local weather, landing zone 128, and other conditions to increase the efficiency of the delivery system 100.

In some examples, when the UAV 104 has crossed the threshold distance 124, or is otherwise within range, the delivery robot 130 and the UAV 104 can begin communications. In some examples, this can be achieved with a direct wireless link (e.g., Bluetooth®, Wi-Fi, or cellular) between the delivery robot 130 and the UAV 104. In other examples, the UAV 104 may be in communication with the central control 110 via a wireless link, for example, and the delivery robot 130 can be in communication with the central control 110 (and thus the UAV 104) via an Internet connection. In still other examples, the UAV 104 and the delivery robot 130 can both be connected to a LAN at the delivery location 106 (e.g., a home Wi-Fi router) and can communicate via the LAN. In some examples, the delivery robot 130 can be connected to the central control 110 via the Internet and the UAV 104 via a wireless link enabling the delivery robot 130 to act as a relay between the central control 110 and the UAV 104. This can enable the UAV 104 to be in communication with the central control 110 despite being otherwise out of communication range with the central control 110.

In some examples, the delivery robot 130 and the UAV 104 can exchange authentication information (e.g., passwords, public/private keys, etc.) to ensure the UAV 104 has found the correct delivery robot 130, and vice-versa. This information can be provided by the central control 110, for example, at the time the order is sent to the delivery robot 130 and UAV 104 (at 404). In some examples, the UAV 104 can provide updated delivery information to the delivery robot 130 for display to the customer, for example, and the delivery robot 130 can provide local, accurate weather and landing information to the UAV 104, among other things.

In other examples, the communications can comprise the delivery robot 130 changing from the long-distance symbol 140*a* to the short-distance symbol 140*b*. The short-distance symbol 140*b* can comprise a more detailed pattern or message to provide additional information to the UAV 104. In some examples, the short-distance symbol 140*b* can comprise an alphanumeric message, a 2- or 3D bar code, a QR code, or other symbol that includes encoded information about the landing zone, weather conditions, or other information relevant to the UAV 104.

In some examples, the short-distance symbol 140*b* can provide a second level of authentication to the UAV 104. So, for example, the long-distance symbol 140*a* can be used to give the UAV a first level of authentication and to ensure that the UAV 104 is likely going to the correct delivery robot 130. Due to its relatively simple nature, however, the long-distance symbol 140*a* may be easily duplicated. Thus, it is possible that people with dishonest intent (or even pranksters) could attempt to mislead the UAV 104. In this case, the delivery robot 130 can display an additional, more complicated short-distance symbol 140*b* to provide additional authentication to the UAV 104. The short-distance symbol 140*b* can also be provided to the delivery robot 130 by the central control 110 and can be encrypted, or otherwise secured, to ensure only the correct delivery robot 130 has the pattern.

In some examples, the short-distance symbol 140*b* can also provide additional information to the UAV 104. In other words, additional information regarding the landing area, weather patterns, wind, barometric pressure, temperature, humidity, tilt angle of the delivery robot 130, and other relevant information can also be included, or encoded, in the short-distance symbol 140*b*. In some examples, the delivery robot 130 can also include a short-distance symbol 140*b* to identify problems in the delivery location 106 and/or to "wave-off" the UAV 104 when issues arise.

In some examples, as discussed below, the delivery robot 130 can alternate between displaying the short-distance symbol 140*b* and displaying other information. Due to the close proximity of the UAV 104 at this stage of the process 400, in some examples, the delivery robot 130 can alternate between the short-distance symbol 140*b* and a warning message. In some examples, the display 202 of the delivery robot 130 may flash red, for example, to inform the customer to stay away from the landing zone 128. The display 202 may also include an ETA countdown based on when the UAV 104 will actually touch down. In some examples, the delivery robot 130 can also play a message over the speakers 206, flash the lights 208, or use other audio or visual warnings to warn the user 136 to stay back.

In some examples, as the UAV 104 approaches the delivery robot 130 for landing, the delivery robot 130 can activate the sensors 132 (e.g., a high-resolution video camera) to provide some feedback on the health of the UAV 104. In other words, if the UAV 104 is missing a part (e.g., a portion of the landing gear has fallen off), the delivery robot 130 can provide this information to the UAV 104 and/or the central control 110. In some examples, depending on the severity of the damage, the UAV 104 may abort the delivery and return to the FC 102 for repairs to avoid a potentially dangerous landing.

At 414, the delivery robot 130 and/or the UAV 104 can confirm the landing of the UAV 104 or the package 108 on, or near, the delivery robot 130. In some examples, as shown, the display 202 can act as a landing pad for the UAV 104 or the package 108. In other words, the UAV 104 can land directly on the delivery robot 130 on the display 202 or can drop the package directly on the display 202. In some examples, the display 202 of the delivery robot 130 can comprise a touchscreen to detect the UAV 104 and/or package 108 touching down on the display 202. In other examples, the UAV 104 can send a message to the delivery robot 130 and/or the central control 110 when the UAVs altimeter reads zero altitude, for example, or when the propeller motor controller 304 deactivates the propulsion system. In some examples, a weight sensor or other means in the delivery robot 130 can detect the weight of the UAV 104 and/or the package 108 on the delivery robot 130.

At 416, the delivery robot 130 can retrieve the package 108, if necessary, and deliver the package 108 to the final destination 142. As mentioned above, in some examples, the UAV 104 can place, or drop, the package 108 on top of the delivery robot 130. In this configuration, the delivery robot 130 may simply carry the package 108 from the landing zone 128 to the final destination 142 with the package 108 on top of the delivery robot 130. In other examples, the delivery robot 130 may place the package inside the storage bay 226 for delivery.

In other examples, rather than landing directly on the delivery robot 130, the UAV 104 can deliver the package 108 to the landing zone 128 and then the delivery robot 130 can retrieve it. Thus, the delivery robot 130 can then retrieve the package 108 using the package manipulator 222 (e.g., a robotic arm). With the package 108 on, or in, the delivery robot 130, the robot can then deliver the package 108 from the landing zone 128 to the final destination 142.

The final destination 142 can include, for example, the front stop of the user's house, the doorway of an apartment, or a designated mailbox or receptacle proximate the user's house or apartment. The final destination 142 can also include an automated storage locker, for example, a concierge desk, or other suitable location. The final destination 142 can also include the storage bay 226 of the delivery robot 130. In this configuration, the delivery robot 130 may simply return to the user's house or to the shelter 146 until the user 136 comes to retrieve the package 108. The user 136 can then enter the appropriate code or use a key, for example, to access the package 108.

In some examples, the delivery robot 130 may have access to the user's house. Thus, the delivery robot 130 may deliver packages 108 to the house using a pet door, for example. The pet door may include RFID access, or other means, to prevent unauthorized access. Thus, the delivery robot 130 can include an access control device such as, for example, an RFID chip, a remote control, or other similar device, to open the user's garage door, front door, or otherwise gain access for final delivery of the package 108.

Figure 5A:
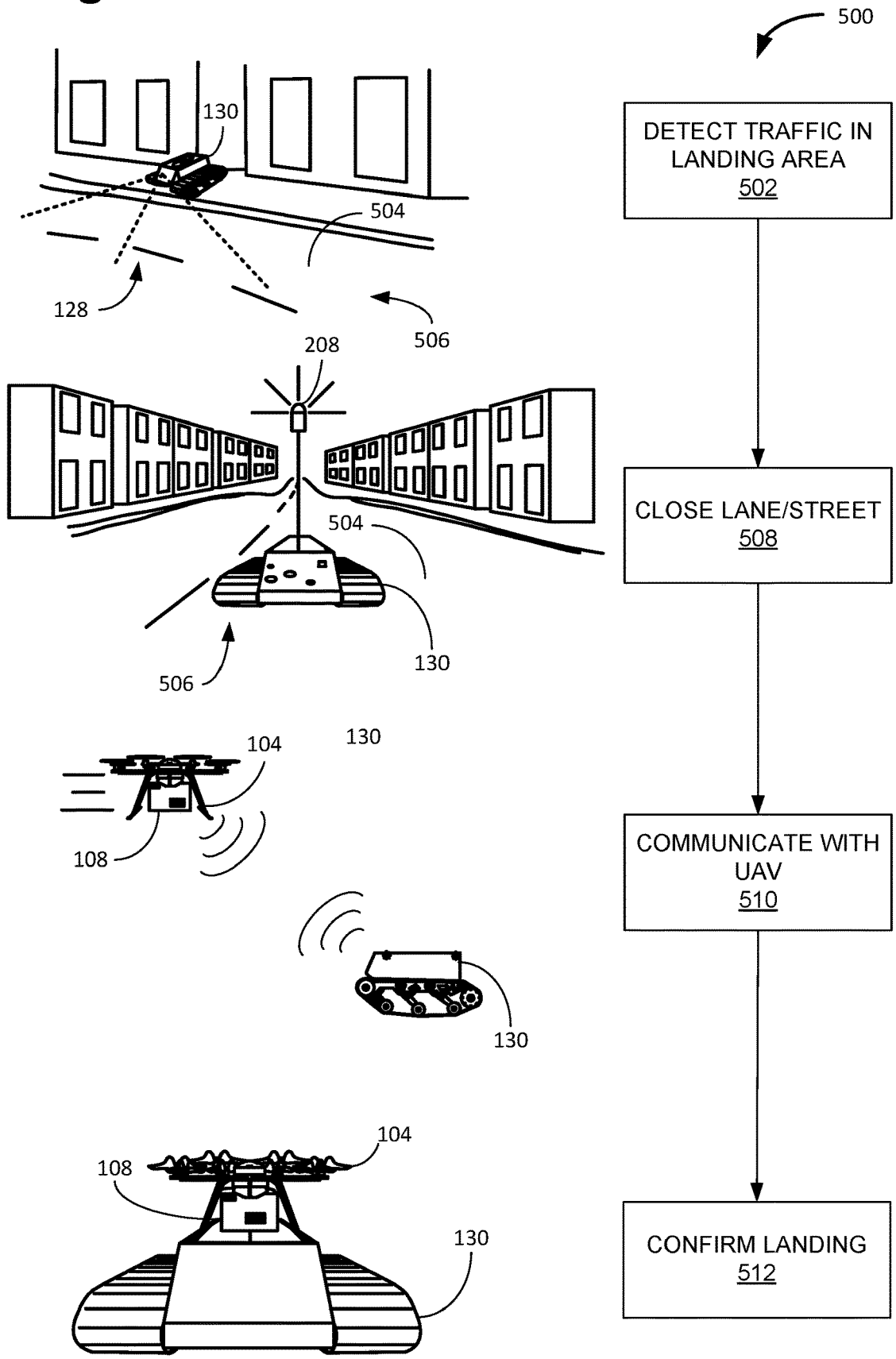
FIGS. 5A and 5B are flowcharts depicting the delivery robot closing a road for a delivery by UAV, in accordance with some examples of the present disclosure.
Figure 5B:
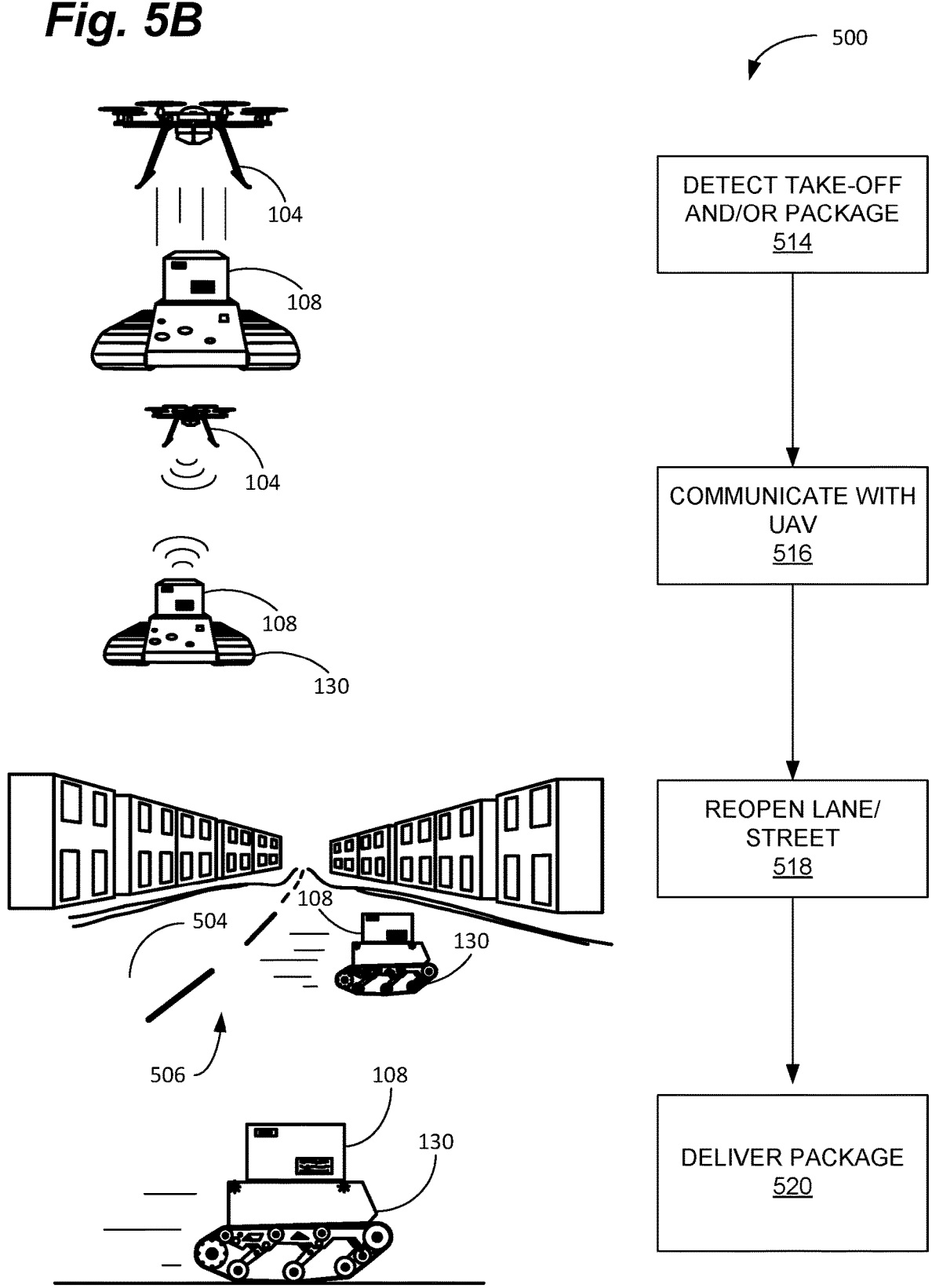

As shown in FIGS. 5A and 5B, in some examples, the only suitable landing zone 128 may be the middle of a street or road. In a crowded urban environment, for example, delivering a package 108 in the middle of the night (e.g., 2 AM) and in the middle of the street may be the most efficient solution. To this end, examples of the present disclosure can also comprise a method 500 for temporarily closing a lane, or an entire street, to enable a UAV 104 to deliver a package 108.

At 502, the delivery robot 130 can assess the landing zone 128, which in this case can be a lane 504 of a street 506, or the entire street 506. As discussed above, the delivery robot 130 can use one or more sensors 132 to determine that (1)

the road 506 is substantially level and free of construction areas, potholes, and other issues and (2) that the landing zone 128 is substantially unobstructed, free from traffic, bystanders, etc. The delivery robot 130 can include cameras 210, proximity sensors 214 (e.g., laser scanners), and other sensors to determine whether any obstacles are in the landing zone 128 for the UAV 104. In some examples, the UAV 104 may use the camera 210 to determine if there is any traffic on the street 506. If there is traffic, the delivery robot 130 can coordinate with the UAV 104 to land when there is little, or no, traffic to minimize any traffic problems caused by the delivery. As mentioned above, in some examples, the deliveries may be scheduled for early morning hours (e.g., 2 AM-4 AM) when traffic is normally minimal.

Optionally, at 508, after locating suitable landing zone 128 and a break in the traffic, for example, the delivery robot 130 can proceed into the street 506 and close off all or part of the street 506. In some examples, the delivery robot 130 can extend and/or activate one or more strobe lights 208, rotating beacons, or other visual and/or one or more speakers 206, sirens, or other aural indicators (collectively, "alerts") that indicate an impending delivery. In some examples, as discussed below with reference to FIG. 6, the alerts may include the delivery robot 130 projecting one or more patterns on the street to provide notice to bystanders, provide a landing pattern, or present other information.

Of course, in some examples, the robot 130 and the UAV 104 can work quickly to obviate the need to close the lane 504. In other words, the robot 130 can identify a break in the traffic, hurry out into the street, receive the package 108 from the UAV 104, and then return to the sidewalk. In some examples, the robot 130 can identify the "Walk" signal or the green light at an intersection, for example, and complete the delivery prior to the light cycling. Absent any pedestrians, the robot 130 can use the crosswalk as a landing zone 128, if desired. Similarly, the robot 130 can also use a parking space, alley, driveway, sidewalk, or other low traffic area for the delivery, reducing the need to restrict traffic.

At 510, as before, the delivery robot 130 can communicate with the UAV 104 to indicate that the landing zone 128 is available. The delivery robot 130 may also receive ETA and other information from the UAV 104. The delivery robot 130 may also provide information to the UAV 104 including, for example, weather and wind conditions, exact GPS coordinates, and any time limit associated with the landing zone 128 (e.g., the delivery robot 130 may only be able to shut down the road 506 for a short time by operation of law).

At 512, the delivery robot 130 and/or the UAV 104 can confirm the landing of the UAV on, or near, the delivery robot 130. In some examples, the display 202 of the delivery robot 130 can comprise a touchscreen to detect the UAV 104 and/or package 108 touching down on the display 202. In other examples, the UAV 104 can send a message to the delivery robot 130 and/or the central control 110 when the UAVs altimeter reads zero altitude, for example, or when the propeller motor controller 304 deactivates the propulsion system. In some examples, a weight sensor or other means in the delivery robot 130 can detect the weight of the UAV 104 and/or the package 108 on the delivery robot 130.

At 514, the delivery robot 130 can detect the take-off of the UAV 104. In some examples, this can be accomplished using the display 202 (e.g., a touchscreen) of the delivery robot 130. In other examples, the delivery robot 130 can include a weight sensor, strain gauge, or other means to detect the change in weight between the UAV 104 with the package 108 and the package 108 alone. In other examples, because the UAV 104, delivery robot 130, and/or central control 110 are in communication, the UAV 104 can simply tell the robot (directly or indirectly) that is has taken off. In still other examples, the delivery robot 130 can use the previously provided weight of the package 108 to determine that the UAV 104 has taken off (i.e., that only the weight of the package 108 remains).

At 516, the UAV 104 can communicate to the delivery robot 130 that it has reached a predetermined height and/or distance from the delivery robot 130. In some examples, the UAV 104 can send a message to the delivery robot 130 when the UAV 104 has (re-)crossed the threshold distance 124. In other examples, the UAV 104 can simply inform the delivery robot 130 that it has reached a predetermined height (e.g., 50 or 100 feet) above the delivery location 106. Regardless of the actual metric, the UAV 104 can send a message to the delivery robot 130 that it is safe for the delivery robot 130 to retrieve the package 108 (if applicable), leave the landing zone 128, and reopen the street 506.

At 518, the delivery robot 130 can vacate and reopen the street 506. This can include the robot leaving the area, of course, but can also include deactivating any lights 208, beacons, sirens, or other alerts. In some examples, as discussed below, the delivery robot 130 can deactivate any projections on the road 506 that include alerts, landing symbols, or other information. At 520, the delivery robot 130 can deliver the package 108 to the final destination 142.

Of course, other methods could be used to deliver packages 108 with minimal disruption. In some examples, the robot 130 can be amphibious. In this configuration, the robot 130 can use lakes, ponds, swimming pools, fountains, and other water features for deliveries. The UAV 104 can drop the package 108 into a lake for an apartment building, for example, to be retrieved by the robot 130. This has the benefit of providing a relatively soft landing for the package 108. In addition, it is unlikely that a small lake or pond will include boats or people.

In other examples, rather than using the street 506 in a static delivery, as discussed above, the robot 130 can actually pace traffic. In this configuration, the robot 130 can assume a position between suitably spaced cars, for example, and travel at the same speed as the cars. The UAV 104 can then land on, or hover above, the robot 130 by pacing the robot, deposit or drop the package 108, and then fly away. The robot 130 can then pull off to the sidewalk, for example, to complete the delivery to the final destination.

Figure 6A:
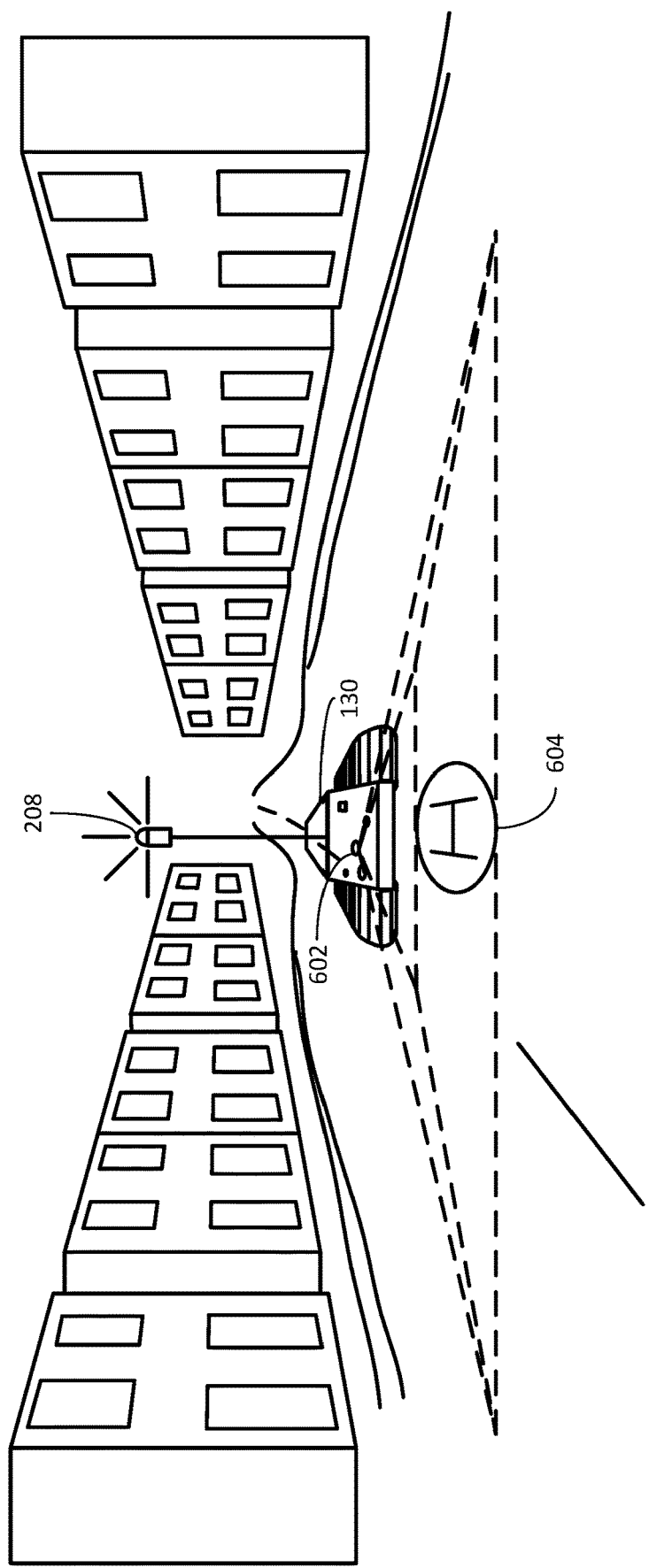
FIG. 6A depicts the delivery robot projecting a landing pattern for the UAV, in accordance with some examples of the present disclosure.

As shown in FIG. 6A, in some examples, regardless of the landing zone 128 used, the delivery robot 130 can include one or more projectors 602. The projectors 602 can be used to display information proximate the delivery robot 130 to close lanes 504, for example, provide alerts to bystanders, or provide a landing pattern for the UAV 104. In some examples, the projectors 602 can be used to display messages for local traffic or bystanders such as, for example, "Lane Closed for Delivery" or "Please stand back 20 feet." As shown, the delivery robot 130 can include projectors 602 in multiple directions to enable the delivery robot 130 to establish a perimeter, for example.

In some examples, as shown, the delivery robot 130 may project a landing pattern 604 on the ground proximate the landing zone 128. As shown, the landing pattern 604 can comprise a simple "H" pattern commonly found on helipads. In other examples, the landing pattern 604 may include wind direction and speed information, or other information relevant to the UAV 104 landing in the landing zone 128. The landing pattern 604 can be used to identify the landing zone 128 for the UAV 104 and can be used to authenticate the delivery robot 130 to the UAV 104 and vice-versa.

Figure 6B:
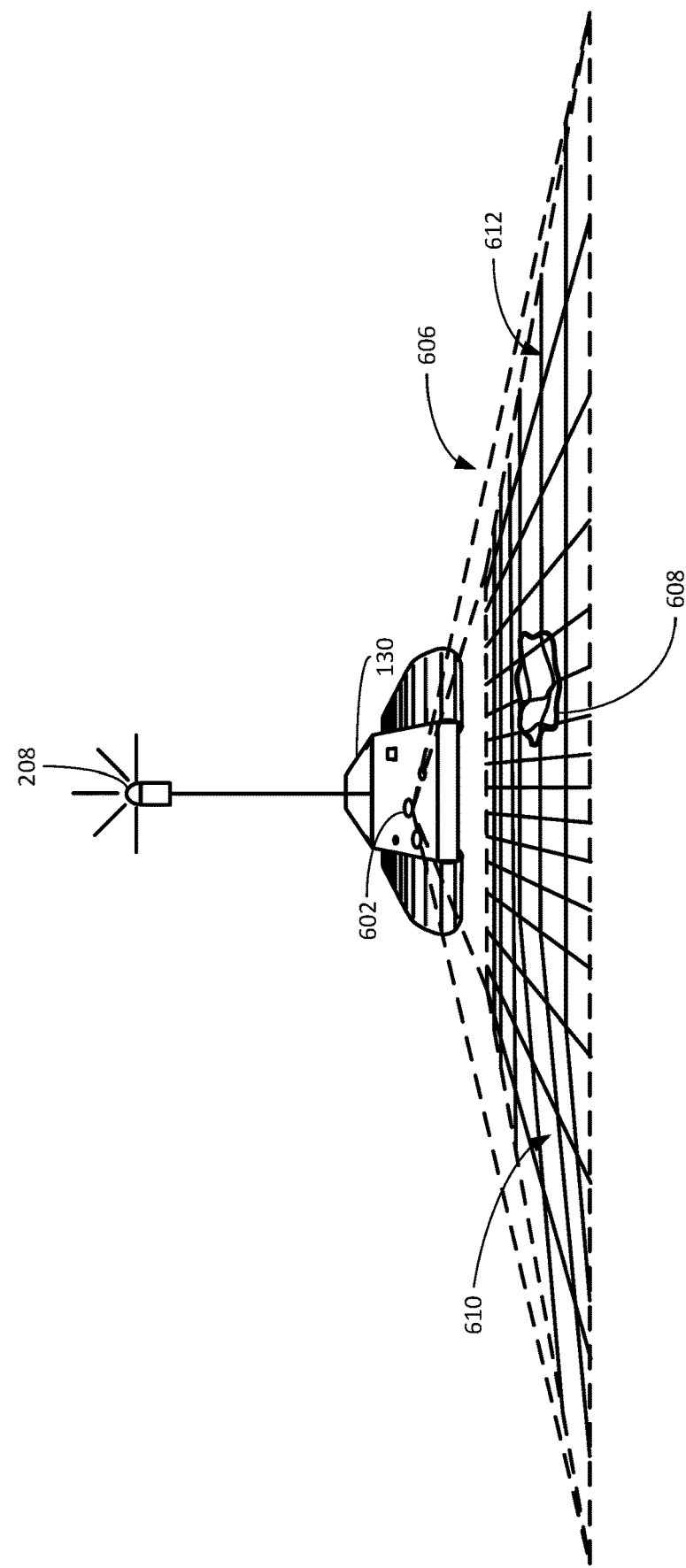
FIG. 6B depicts the delivery robot projecting a topographical pattern for the UAV, in accordance with some examples of the present disclosure.

As shown in FIG. 6B, in other examples, the projectors 602 can project a topographical pattern 606 in the landing zone 128. The topographical pattern 606 can enable cameras and other sensors on the UAV 104 to detect imperfections, slope, and other features in the landing zone 128. In the street landing scenario discussed above, for example, the topographical pattern 606 can expose any potholes 608, slope 610, or other features in the street 506.

When not using the delivery robot 130 as a landing pad, therefore, the topographical pattern 606 can enable the UAV 104 to adjust its exact landing point to a more level area 612, for example, rather than landing on the slope 610 or the pothole 608. This can prevent damage to the UAV 104 and package 108, among other things.

Figure 7A:
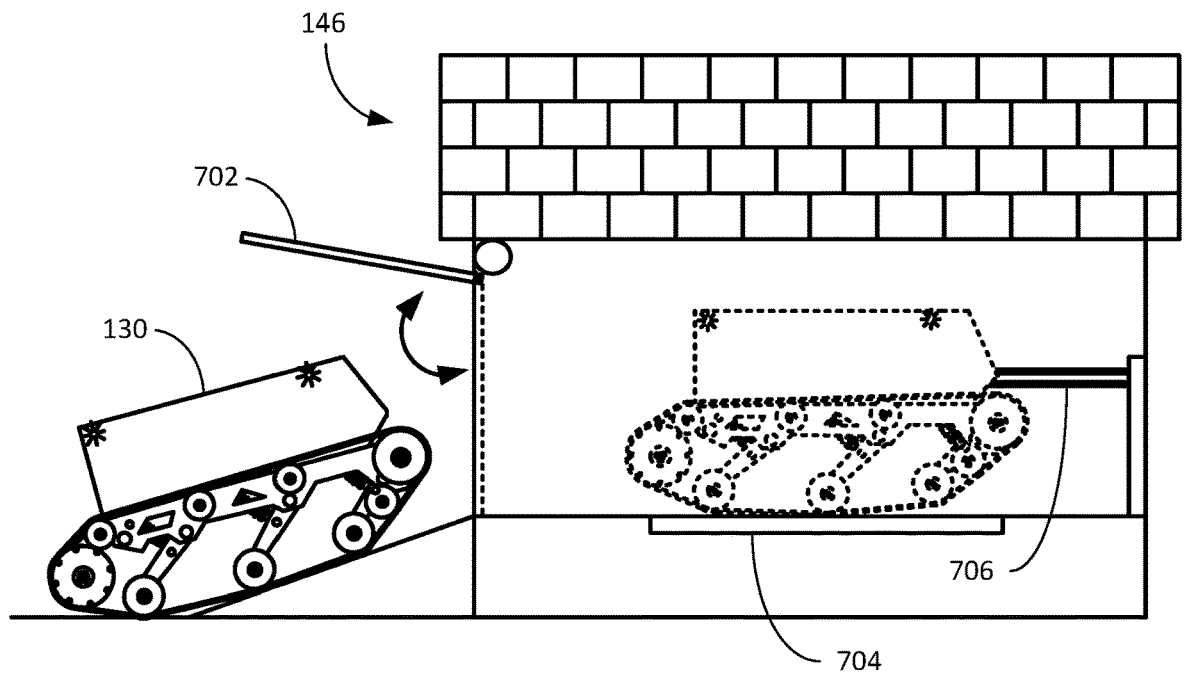
FIGS. 7A and &B are side and front views, respectively, of a shelter for the delivery robot, in accordance with some examples of the present disclosure.
Figure 7B:
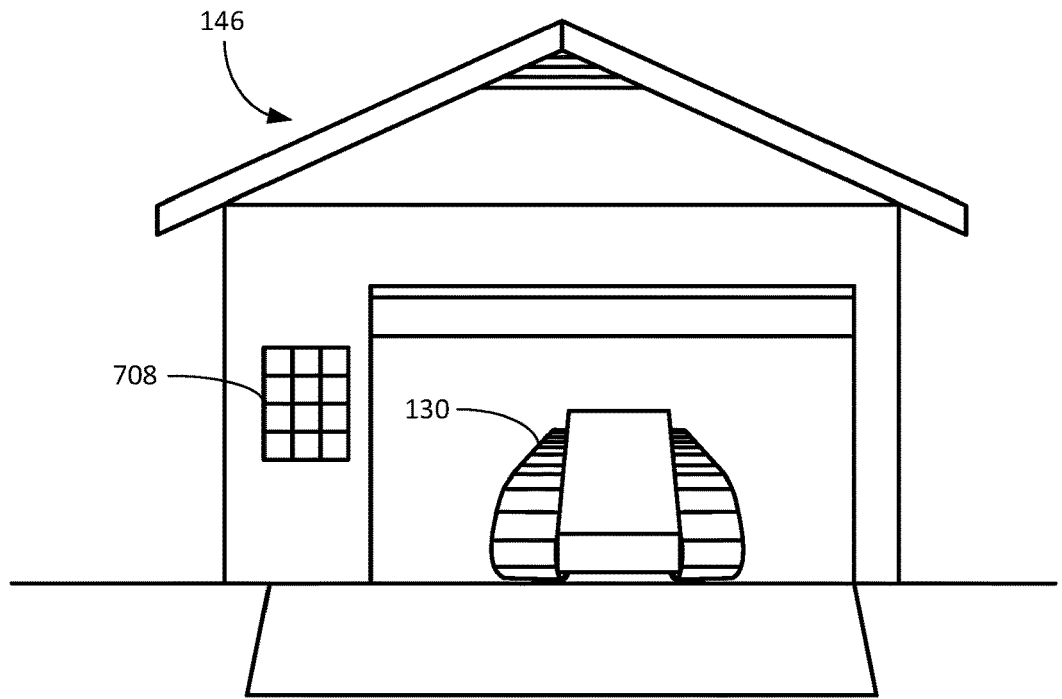

As shown in FIGS. 7A and 7B, and as mentioned above, the system 100 can also include a shelter 146. In some examples, the shelter 146 can be used to store and maintain the delivery robot 130 and/or the package 108. As shown, in some examples, the shelter 146 can essentially be a garage to protect the delivery robot 130 from the elements. The shelter 146 can comprise, for example, an access door 702 and one or more battery chargers 704 or refueling probes 706.

In some examples, the battery charger 704 can comprise an inductive charger that enables the batteries in the delivery robot 130 to recharge when the delivery robot 130 parks on top of the charger 704. In other examples, the charger 704 can plug into the delivery robot 130 with, for example, a plug or cord. In some examples, the refueling probe 706 can enable the delivery robot 130 to be refueled with a liquid or gaseous fuel such as, for example, gasoline, nitromethane, propane, or natural gas. In either case, the charger 704 or refueling probe 706 can enable the delivery robot 130 to receive and deliver packages, refuel/recharge, and escape the elements, as necessary.

In some examples, the shelter 146 can also act as a safe. In other words, the shelter 146 can be secure, with access provided via the access door 702. In this manner, once the delivery robot 130 has entered the shelter 146 and the access door 702 is closed, the package 108 is protected from the elements and from theft. An authorized user with an access code can then retrieve the package 108 using an access control device 708, such as a keypad, fingerprint scanner, or lock. Thus, the shelter 146 can protect the delivery robot 130 and the package 108 from the elements and from theft until the package is accessed by the recipient.

As mentioned above, the delivery robot 130 can receive the package 108 at the landing zone 128 and then take the package to the final destination 142. This may be because the user 136 lives in an apartment building, a high density urban area, a wooded area, or other situation where packages 108 cannot easily be delivered directly to the user 136. Thus, the delivery robot 130 can receive the package 108 and then deliver it to the user's house 144, the shelter 146, or an automated locker system.

Figure 8A:
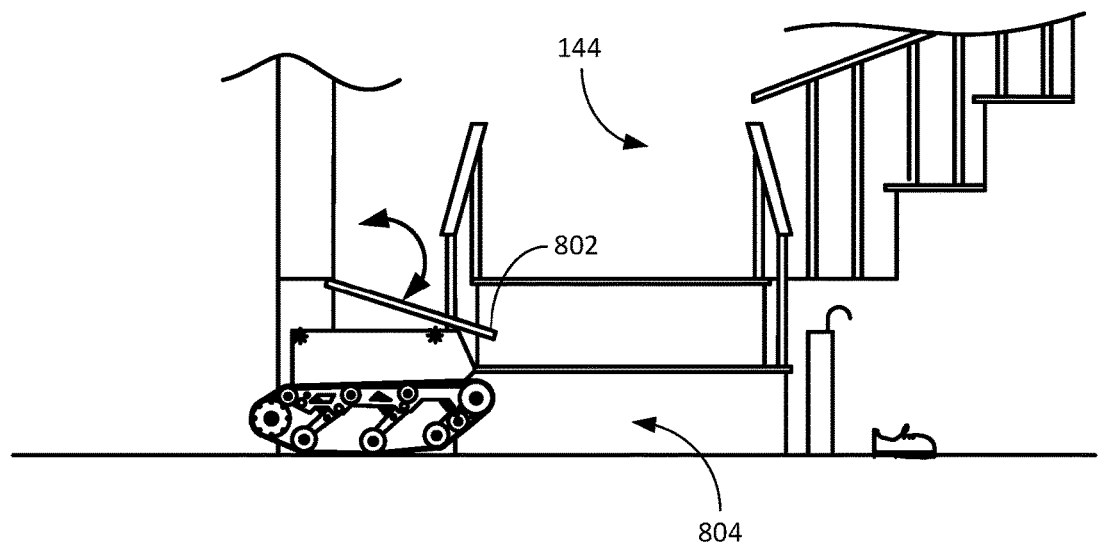
FIG. 8A depicts the delivery robot delivering a package to a final destination—the user's foyer, in accordance with some examples of the present disclosure.

As shown in FIG. 8A, therefore, in some examples, the delivery robot 130 can have access to the user's house 144 via an access door 802. In some examples, the access door 802 may be sized and shaped to enable the delivery robot 130 to enter the house 144, but small enough to prevent people from entering. In other examples, the delivery robot 130 can include a radio frequency identification (RFID) chip, remote control, or other access control device. In this configuration, the delivery robot 130 can deliver the package 108 into the user's foyer 804, garage, or other suitable location where the package is secure and protected from the elements.

Figure 8B:
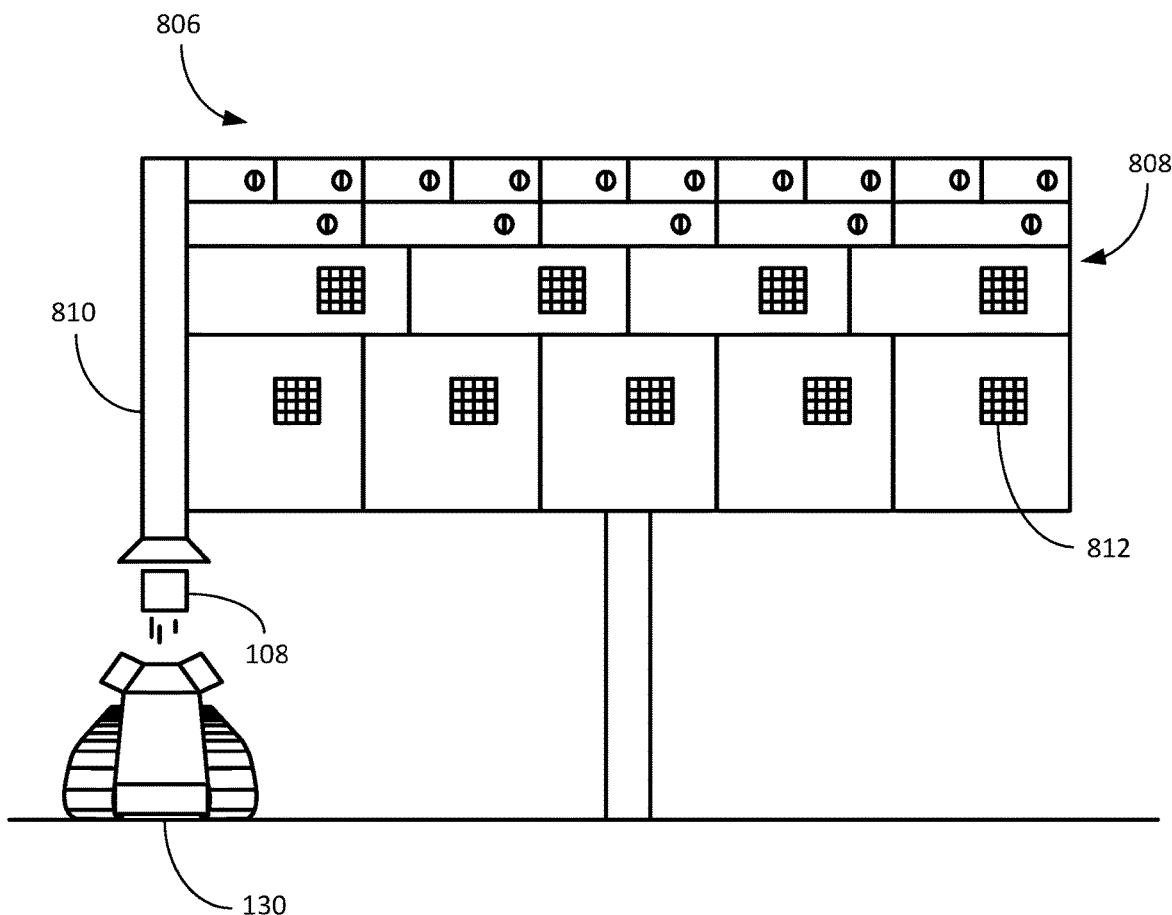
FIG. 8B depicts the delivery robot delivering a package to the final destination—an automated locker system, in accordance with some examples of the present disclosure.

As shown in FIG. 8B, in some examples, the delivery robot 130 can deliver the package 108 to an automated locker system 806. The automated locker system 806 can include a plurality of lockers 808 and a package retrieval system 810. In this manner, the delivery robot 130 can retrieve the package 108 from the landing zone 128 and delivery it to the automated locker system 806 for placement in an appropriate locker 808.

The automated locker system 806 may include a package retrieval system 810, such as a vacuum tube, robotic arm, conveyor system, or other means, to remove the package 108 from the delivery robot 130 and place it in a locker 808. The user 136 can then retrieve the package 108 by access the appropriate locker 808 using an access control device 812 such as, for example, a keypad, keyed lock, fingerprint scanner, or other suitable means. The automated locker system 806 may be particularly useful in high density urban area and apartment buildings, for example, where space is at a premium. Again, the automated locker system 806 can protect the package 108 from the elements and prevent theft until the user 136 retrieves the package 108.

While several possible examples are disclosed above, examples of the present disclosure are not so limited. For instance, while systems and methods for delivering packages with UAVs 104 and robots 130 has been disclosed, other devices could be used to deliver packages 108 to the robots 130, and other items could be delivered in a similar manner, without departing from the spirit of the disclosure. In addition, the location and configuration used for various features of examples of the present disclosure such as, for example, the order of steps, the components of the delivery system 100 or the delivery robot 130, and the materials used can be varied according to a particular UAV 104, delivery robot 130, or landing zone 128 that requires a slight variation due to, for example, the size or construction of the delivery robot 130, the fragility of the packages 108, and/or the landing zone 128 conditions (e.g., special considerations may be required for crowded urban areas when compared to rural areas). Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system to deliver a package via an unmanned aerial vehicle (UAV) and a ground-based delivery robot, the system comprising:
    a central control in communication with the UAV and the ground-based delivery robot to provide one or more navigation instructions to at least one of the UAV or the ground-based delivery robot;
    the UAV to deliver the package to a landing zone based at least in part on one or more delivery instructions received from the ground-based delivery robot; and
    the ground-based delivery robot to select the landing zone, issue the one or more delivery instructions to the UAV, receive the package in the landing zone, and deliver the package to a final destination, the ground-based delivery robot comprising:
  one or more sensors to survey the landing zone and generate survey information for the UAV;
  a transceiver to communicate the survey information directly to the UAV;
  a projector to project a landing pattern on a surface proximate to the landing zone for the UAV, the landing pattern indicating first information directed to the UAV that guides the UAV to the landing pattern and the landing zone; the projector to project, prior to the UAV landing at the landing zone, second information that is different than the landing pattern, the second information directed to an entity that is different than the UAV, the projector projecting the second information upon a determination that the UAV is within a threshold distance from the landing zone, the projector alternating between projecting the landing pattern and the second information as the UAV approaches the landing pattern, the second information indicating to the entity that the UAV is approaching and an estimated time of arrival for approach or landing of the UAV; and
  a non-aerial drive system to move the ground-based delivery robot via ground travel on at least one ground surface from the landing zone to the final destination based at least in part on the one or more delivery instructions.

2. The system of claim 1, further comprising an automated locker system comprising:
  a plurality of lockers; and
  a plurality of access control devices, each of the plurality of lockers comprising an access control device of the plurality of access control devices;
  wherein the final destination comprises the automated locker system.

3. The system of claim 1, further comprising a shelter, the shelter comprising:
  an access door to enable the ground-based delivery robot to enter the shelter;
  one or more of a charger and a refueling probe to at least one of recharge or refuel the ground-based delivery robot; and
  an access control device to enable a user to access the shelter to retrieve the package;
  wherein the shelter is the final destination; and
  wherein the ground-based delivery robot further comprises a complementary access control device to enable the ground-based delivery robot to open the access door of the shelter.

4. The system of claim 1, wherein the projector projects the landing pattern on a surface within the landing zone.

5. The system of claim 1, wherein the second information includes an alert or message to at least one of vehicles or bystanders to avoid the landing zone.

6. A method comprising:
  receiving a first signal from a central control at a ground-based delivery robot that a package has been scheduled for delivery by an unmanned aerial vehicle (UAV) to a delivery location associated with the ground-based delivery robot;
  activating a drive system on the ground-based delivery robot to move the ground-based delivery robot via ground travel on at least one ground surface from a current location of the ground-based delivery robot to a landing zone associated with the delivery location;
  surveying the landing zone with one or more sensors on the ground-based delivery robot to generate survey information;
  communicating the survey information to the UAV;
  causing, via a projector of the ground-based delivery robot, a projection of a first symbol that indicates first information directed to the UAV to be displayed on a surface proximate to the landing zone;
  receiving, from the UAV, a second signal indicating that the UAV has crossed a first threshold distance to the landing zone, the first threshold distance being a specified distance between the UAV and the landing zone;
  causing, via the projector of the ground-based delivery robot, a second projection of a second symbol that indicates second information directed to an entity that is different than the UAV to be displayed on the surface proximate to the landing zone, the second information being different than the first information and the second symbol being different than the first symbol, the projector of the ground-based delivery robot alternating between projecting the first symbol and the second symbol as the UAV approaches the landing zone;
  determining, with the one or more sensors on the ground-based delivery robot, that the UAV or the package has landed on or within a second threshold distance from the ground-based delivery robot; and
  activating the drive system on the ground-based delivery robot to deliver the package from the landing zone to a final destination via ground travel on the at least one ground surface.

7. The method of claim 6, wherein the landing zone is a first landing zone, and further comprising:
  surveying a second landing zone with the one or more sensors on the ground-based delivery robot;
  selecting the first landing zone based at least in part on the survey information; and
  sending a third signal to the UAV to use the second landing zone.

8. The method of claim 7, wherein selecting the first landing zone based at least in part on the survey information comprises identifying one or more problems in the second landing zone that do not exist in the first landing zone.

9. The method of claim 7, wherein selecting the first landing zone based at least in part on the survey information comprises identifying one or more problems in the second landing zone that do not exist in the first landing zone; and
  wherein the one or more problems comprise one or more obstructions in the second landing zone.

10. The method of claim 6, wherein the final destination comprises a shelter, and further comprising:
  accessing the shelter, with the ground-based delivery robot, via an access door on the shelter to at least one of secure the package, store the ground-based delivery robot, or at least one of recharge or refuel the ground-based delivery robot.

11. The method of claim 6, further comprising:
  causing one or more bay doors on the ground-based delivery robot to open to enable an automated locker system to retrieve the package;
  wherein the final destination is the automated locker system.

12. The method of claim 6, wherein the first symbol indicates a first distance to the landing zone and the second symbol indicates a second distance to the landing zone that is less than the first distance.

13. The method of claim 12, wherein:

the first symbol is displayed at a first time and the second symbol is displayed at a second time that is subsequent to the first time; and the first distance is greater than the second distance.

14. A method comprising:

receiving a first signal from a central control at a ground-based delivery robot that a package has been scheduled for delivery by an unmanned aerial vehicle (UAV) at a delivery location associated with the ground-based delivery robot;

performing, with one or more sensors on the ground-based delivery robot, a survey of a landing zone to generate survey information for the UAV;

determining, based at least in part on the survey information, that the landing zone is free from obstructions that inhibit deposit of the package by the UAV;

communicating the survey information to the UAV;

activating a drive system on the ground-based delivery robot to move the ground-based delivery robot via a ground surface into the landing zone;

receiving, at the ground-based delivery robot from the UAV, an approach notification from the UAV;

activating, in response to receiving the approach notification, one or more alerts on the ground-based delivery robot to indicate a presence of the landing zone, the one or more alerts including at least one of activation of one or more lights of the ground-based delivery robot or an audible signal emitted by a siren or a speaker of the ground-based delivery robot, the one or more alerts being directed to an entity different than the UAV;

causing, while the UAV is approaching the landing zone, the ground-based delivery robot to alternate between emitting the one or more alerts and projecting one or more symbols that are directed to the UAV;

sending a second signal from the ground-based delivery robot to the UAV that the ground-based delivery robot is in place in the landing zone; and confirming with the one or more sensors that the UAV or the package has landed in the landing zone.

15. The method of claim 14, further comprising:

receiving a third signal that the UAV has crossed a threshold distance leaving the landing zone;

deactivating the one or more alerts on the ground-based delivery robot; and activating the drive system on the ground-based delivery robot to take the package from the landing zone to a final destination.

16. The method of claim 14, further comprising:

causing the ground-based delivery robot to display the one or more symbols on a display on the ground-based delivery robot to provide information to the UAV.

17. The method of claim 16, wherein causing the ground-based delivery robot to display the one or more symbols on the display comprises causing the display to display one or more of a quick-response (QR) code or bar code.

18. The method of claim 14, wherein the one or more alerts indicate an estimated time of arrival of approach or landing of the UAV at the landing zone.

19. The method of claim 14, further comprising:

causing the ground-based delivery robot to project a landing pattern in the landing zone with a projector on the ground-based delivery robot to identify the landing zone for the UAV.

20. The method of claim 14, further comprising:

activating an access control device to gain access to a final destination; and leaving the package at the final destination.

21. The method of claim 14, wherein activating the one or more alerts on the ground-based delivery robot comprises projecting a pattern on the ground proximate the landing zone.

\* \* \* \* \*